US011803792B2

(12) United States Patent
Makhija et al.

(10) Patent No.: US 11,803,792 B2
(45) Date of Patent: Oct. 31, 2023

(54) RISK MANAGEMENT

(71) Applicant: NB Ventures, Inc., Clark, NJ (US)

(72) Inventors: Subhash Makhija, Westfield, NJ (US); Sandeep Damodar Bhide, Randolph, NJ (US); Nilang Mahendrakumar Joshi, Edison, NJ (US); Kshitiz Arora, Rahway, NJ (US)

(73) Assignee: NB Ventures, Inc., Clark, NJ (US)

( * ) Notice: Subject to any disclaimer, the term of this patent is extended or adjusted under 35 U.S.C. 154(b) by 39 days.

(21) Appl. No.: 16/996,343

(22) Filed: Aug. 18, 2020

(65) Prior Publication Data

US 2022/0058554 A1 Feb. 24, 2022

(51) Int. Cl.
*G06Q 10/0631* (2023.01)
*G06Q 10/0637* (2023.01)
*G06N 3/08* (2023.01)
*G06Q 10/08* (2023.01)
*G06F 18/214* (2023.01)

(52) U.S. Cl.
CPC ... *G06Q 10/06315* (2013.01); *G06F 18/2148* (2023.01); *G06N 3/08* (2013.01); *G06Q 10/06375* (2013.01); *G06Q 10/08* (2013.01)

(58) Field of Classification Search
CPC ....... G06Q 10/06315; G06Q 10/06375; G06Q 10/068; G06K 9/6257; G06N 3/08
See application file for complete search history.

(56) References Cited

U.S. PATENT DOCUMENTS

| 2003/0033179 A1* | 2/2003 | Katz | G06Q 10/0631 |
| | | | 705/7.41 |
| 2010/0198631 A1* | 8/2010 | Edwards | G06Q 10/00 |
| | | | 705/35 |
| 2016/0224911 A1* | 8/2016 | Rush | G06Q 10/0635 |
| 2018/0053115 A1* | 2/2018 | Vachhani | G06Q 30/0204 |
| 2020/0273046 A1* | 8/2020 | Biswas | G06Q 10/0635 |
| 2020/0293962 A1* | 9/2020 | Herman | G06Q 10/0633 |

FOREIGN PATENT DOCUMENTS

| CN | 110046815 A | * 7/2019 | ......... G06Q 10/0635 |
| CN | 110610431 A | * 12/2019 | ....... G06F 16/90335 |
| CN | 112150298 A | * 12/2020 | ........... G06F 16/367 |

(Continued)

OTHER PUBLICATIONS

"A Supply Risk Reduction Model Using Integrated Multicriteria Decision Making", by Thomas J. Kull and Srinivas Talluri, IEEE Transactions on Engineering Management, vol. 55, No. 3, Aug. 2008. (Year: 2008).*

(Continued)

*Primary Examiner* — Pan G Choy
(74) *Attorney, Agent, or Firm* — BrownWinick Law Firm; David M. Breiner

(57) ABSTRACT

The present invention discloses a method, a system and a computer program product for risk management in supply chain. The invention includes structuring of risk data fields on an application user interface for creating risk data objects based on a SCM task. The invention includes predicting inherent risk associated with execution of the SCM task and generating control data fields on the application user interface for mitigating the inherent risk.

33 Claims, 19 Drawing Sheets

(56) References Cited

FOREIGN PATENT DOCUMENTS

WO    WO-2009011915  A2  *   1/2009    ......... G06Q 10/0635
WO    WO-2016118979  A2  *   7/2016    ........... G06F 16/254

OTHER PUBLICATIONS

"Risk Management: A Business Enabler or a Compliance Issue?", by Duncan Wernberg, Strategic Management in the Faculty of Management at the University of Johnnesburg, 2015. (Year: 2015).*
"Data Analytics for Healthcare: Modeling and Risk Prediction", by Hui Li, May 2015, Department of Computer Science and Engineering, Faculty of the Graduate School of the University at Buffalo, State University of New York. (Year: 2015).*

* cited by examiner

| Id | Risk Characteristics Name | Description | Weightage | Risk Cat 1 | Risk Cat 2 |
|---|---|---|---|---|---|
| 1 | Essentiality of the Service/Product | Essentiality of the Service/Product | 5.000 | Yes | No |
| 2 | Information Access | Information Section | 5.000 | Yes | No |
| 3 | Physical Access/Access to Networks | Physical Access/Access to Networks | 5.000 | Yes | No |
| 4 | Nature/Level of Customer Interaction | Nature/Level of Customer Interaction | 5.000 | Yes | No |
| 5 | Legal/Regulatory Compliance Impact | Legal/Regulatory Compliance Impact | 5.000 | Yes | No |
| 6 | Reputational Impact | Reputational Impact | 5.000 | No | Yes |
| 7 | Financial Transaction | Financial Transaction | 5.000 | Yes | No |
| 8 | Financial Impact | Financial Impact | 5.000 | Yes | No |
| 9 | Dependence on Subcontractors | Dependence on Subcontractors | 5.000 | No | Yes |
| 10 | OSP Risk | OSP Risk | 5.000 | No | Yes |
| 11 | Country Risk | Country Risk 1 | 5.000 | No | No |
| 12 | Financial Risk Rating | Financial Risk Rating 1 | 5.000 | No | No |
| 13 | Technology Software Risk | Technology Software Risk | 5.000 | No | Yes |
| 14 | Geopolitical Risk | Geopolitical Risk | 5.000 | No | Yes |
| 15 | Fraud Risk | Fraud Risk | 5.000 | Yes | No |

FIG. 3B

| Id | Risk Characteristics Name | Score Level From | Score Level To | Score Name | Code |
|---|---|---|---|---|---|
| 1 | Essentiality of the Service/Product | 0 | 0.01 | Not applicable | #808080 |
| 2 | Essentiality of the Service/Product | 1 | 3.1 | Very Low | #228B22 |
| 3 | Essentiality of the Service/Product | 8.84 | 17.67 | Low | #90EE90 |
| 4 | Essentiality of the Service/Product | 17.68 | 35.35 | Medium | #FFFF00 |
| 5 | Essentiality of the Service/Product | 35.36 | 70 | High | #FF0000 |
| 6 | Essentiality of the Service/Product | 70.01 | 100 | Very High | #8B0000 |
| 7 | Information Access | 0 | 0.00001 | Not applicable | #808080 |
| 8 | Information Access | 0.01 | 8.83 | Very Low | #228B22 |
| 9 | Information Access | 8.84 | 15.38 | Low | #90EE90 |
| 10 | Information Access | 15.39 | 30.77 | Medium | #FFFF00 |
| 11 | Information Access | 30.78 | 61.55 | High | #FF0000 |
| 12 | Information Access | 61.56 | 100 | Very High | #8B0000 |

FIG. 3C

| Id | Risk Characteristics 1 | Risk Characteristics 2 | Interaction Factor |
|---|---|---|---|
| 1 | Essentiality of the Service/Product | Dependence on Subcontractors | 0.005 |
| 2 | Information Access | Dependence on Subcontractors | 0.004 |
| 3 | Physical Access/Access to Networks | Dependence on Subcontractors | 0.002 |
| 4 | Nature/Level of Customer Interaction | Dependence on Subcontractors | 0.001 |
| 5 | Legal/Regulatory Compliance Impact | Dependence on Subcontractors | 0.011 |
| 6 | Financial Transaction | Dependence on Subcontractors | 0.043 |
| 7 | Financial Impact | Dependence on Subcontractors | 0.089 |
| 8 | Fraud Risk | Dependence on Subcontractors | 0.009 |
| 9 | Essentiality of the Service/Product | OSP Risk | 0.04 |
| 10 | Information Access | OSP Risk | 0.06 |
| 11 | Physical Access/Access to Networks | OSP Risk | 0.03 |
| 12 | Nature/Level of Customer Interaction | OSP Risk | 0.08 |
| 13 | Legal/Regulatory Compliance Impact | OSP Risk | 0.09 |
| 14 | Financial Transaction | OSP Risk | 0.02 |
| 15 | Financial Impact | OSP Risk | 0.05 |
| 16 | Fraud Risk | OSP Risk | 0.08 |

FIG. 3D

| Id | Result | Gap | Effectiveness | Status | Guidance |
|---|---|---|---|---|---|
| 1 | AB-Standard Risk- Negative news found - previously reviewed by ICRM | Standard Gap | Pending entity response | Go with Gaps | When TPU L2 approves the risk object identifying Gaps |
| 2 | AB-Standard Risk- Negative news found- ICRM Review required | No Gap | Pending TPU L2 Review | NO GO | When the risk object response is submitted by the Supplier |
| 3 | Low with No Gaps | No Gap | Completed | Go | When TPU L2 approves the risk object identifying No Gaps |
| 4 | ELC-BAO Remediated Gaps-Pending with ELC team | Gap | Pending with ELC- Gap Remediation | Go with Gaps | When BAO remediates the Gaps identified and submits for review |
| 5 | AVA-Assessment in Progress | Gap | Pending L1 Review | Go with Gaps | Once the BAO submits the CSI ID |
| 6 | AVA-AVA conditionally approved | Gap | AVA conditionally approved | Go with Gaps | When AVA team provides approval with conditions |
| 7 | AVA-AVA Fully Approved | No Gap | AVA fully Approved | Go | When AVA approves BAO Submission |
| 8 | AVA-AVA/Checker fully Approved | No Gap | AVA fully Approved | Go | When TPU L2 approves the risk object |
| 9 | AB-Pending supplier response | Gap | Pending Entity response | NO GO | When the control is Triggered to Supplier (GCQ) |
| 10 | AVA-TPU Received Incomplete Response from Entity | Gap | Pending Entity Resubmission | Go with Gaps | When TPU L1 rejects the risk object |

| No | Rating | Weight | Rating Scale |
|----|--------|--------|--------------|
| 1 | Ineffective | Weight – 5 | 4.34 – 5.00 |
| 2 | Partially Ineffective | Weight – 4 | 2.01 – 4.33 |
| 3 | Effective | Weight – 1 | 0.34 – 2.00 |
| 4 | Highly Effective | Weight - 0 | 0.00 – 0.33 |

Overall Control assessment per Risk

| | | -3 Tiers | -2 Tiers | -1 Tier | No Change | |
|---|---|---|---|---|---|---|
| | IR rating | Highly Effective | Effective | Partially Ineffective | Ineffective | |
| Inherent Risk Rating | Tier 1 | Tier 3 | Tier 3 | Tier 2 | Tier 1 | High |
| | Tier 2 | Tier 5 | Tier 4 | Tier 3 | Tier 2 | |
| | Tier 3 | Tier 5 | Tier 5 | Tier 4 | Tier 3 | Medium |
| | Tier 4 | Tier 5 | Tier 5 | Tier 5 | Tier 4 | |
| | Tier 5 | Tier 5 | Tier 5 | Tier 5 | Tier 5 | Low |

FIG. 4E

RISK MANAGEMENT

BACKGROUND

1. Technical Field

The present invention relates generally to risk management. More particularly, the invention relates to systems, methods and computer program product for risk management in supply chain.

2. Description of the Prior Art

Risk management plays a vital role in the secured execution of any task for an organization. Moreover, risk management for supply chain functions is extremely critical and requires a quantifiable assessment of each individual or inter-related functions and associated parties.

Organizations deploy third parties for performing certain activities and try to shift some obligation of ensuring compliance with laws and regulations. However, such transfer of activity does not reduce the responsibility of the organization. Moreover, the organization needs to ensure compliance testing of the third party to ascertain that they meet the requirements. Depending on the nature of risks involved in the execution of the supply chain function, risk management needs to be commensurate with the level of risk and complexity of the relationship with the third parties. The obligation to determine and assess the risks is with the organization but such assessment is conducted in silos which makes it difficult for any organization to appropriately identify the extent of the risk for making an informed decision.

In supply chain applications, one function may not cater to the risk associated with another. For example, while initiating a sourcing request, the user will cater to the risk associated with shortlisting of suppliers, IT security-related risk but may not necessarily look at the transportation or inventory management modules of the supply chain. Moreover, certain items may have a specific lifecycle or certain specific transportation requirement related to appropriate packaging, etc.; the risks associated with improper transportation may not be considered for evaluation.

Further, category-based risks are not evaluated for all types of items within a category. Certain items in the same category may have commonalities associated with the risks. Alternately, certain items in say a first category may have commonalities associated with the risks of a second category. This requires a multidimensional approach with data processing at a granular level for risk assessment. Since the supply chain includes an assessment of humongous volume of data, it is almost impossible to gather all the resources and process the information to draw meaningful insights for informed decisions.

Organizations that are unable to assess the risks accurately due to the varying circumstances involved in the evaluation of risk associated with different functions of a supply chain, inevitably incur damages. Moreover, the identification, assessment, and mitigation of risk require a structured approach with faster and accurate data processing capabilities. Since, the number of parameters to be factored in the risk management processes itself changes dynamically, the reliance on a disconnected risk assessment approach at multiple levels is very risky. The risk management applications operating with external integration with supply chain function require structuring such integration which makes it extremely inaccurate and cumbersome. Even when computing systems and its processing capabilities are used, the results are inaccurate due to the underlining uncertainty about the information being processed. While, the techniques for automated processes are obsolete, less accurate, and time-consuming, processing certain parameters to ensure efficient risk management is never considered.

In view of the above problems, there is a need for a system and method of data processing for risk management in supply chain that can overcome the problems associated with the prior arts.

SUMMARY

According to an embodiment, the present invention provides a method of data processing for risk management. The method comprises receiving a request for execution of a supply chain management (SCM) task at a server, identifying by an AI engine coupled to a processor, one or more risk data fields associated with execution of the task wherein the risk data fields are fetched from a data lake based on one or more risk data models, generating one or more risk data objects on an application user interface by structuring the identified risk data fields wherein a bot is configured to create a data script based on the SCM task, the one or more data models and AI processing for structuring the risk data fields to generate the one or more risk data objects. The method includes predicting an inherent risk associated with execution of the task based on a response to the risk data objects received at the server wherein the bot analyzes the response to each of the one or more risk data objects for determining risk characteristics to predict the inherent risk, and identifying and generating one or more actionable controls on the interface based on the predicted inherent risk for risk mitigation wherein the actionable controls are one or more control data objects with structured control data fields impacting the execution of the task.

In an embodiment the AI engine creates the one or more risk data models by fetching a plurality of codes from a set of normalized historical risk data, extracting a plurality of distinct data from the normalized historical risk data to create a list of variables, transforming the normalized historical risk data into a training data matrix using the list of variables, and creating a risk data training model from the code and the data matrix using machine learning (ML) and artificial intelligence (AI).

In an embodiment, the present invention includes a system for risk management in supply chain. The system includes a server configured for receiving a request to execute a SCM task, an AI engine coupled to a processor configured for identifying one or more risk data fields associated with execution of the task. The system includes a data lake configured to store the risk data fields and one or more risk data models wherein the risk data fields are fetched from the data lake based on one or more risk data models, an application user interface configured for generating one or more risk data objects by structuring the identified risk data fields wherein a bot is configured to create a data script based on the SCM task, the one or more data models and AI processing for structuring the risk data fields to generate the one or more risk data objects. The system also includes a controller encoded with instructions enabling the controller to function as the bot for enabling the AI engine to predict an inherent risk associated with execution of the task based on a response to the risk data objects received at the server wherein the bot analyzes the response to each of the one or more risk data objects for determining risk characteristics, and one or more actionable controls identified and generated on the interface based on the predicted inherent risk for risk mitigation wherein the actionable controls are one or more control data objects with structured control data fields impacting the execution of the task.

In an embodiment the present invention provides a rule engine for risk management. The rule engine includes a compiler configured for processing a task received from a user through an application user interface of an SCM application; and a code module configured for generating a plurality of protocols based on the task, a plurality of metadata, one or more risk data objects, one or more control data objects, and one or more data models associated with one or more risk data fields wherein the protocols are generated for executing the task based on an AI based processing logic, wherein a controller coupled to the rule engine enables prediction of an inherent risk associated with execution of the task based on a response to the risk data objects received at a server and triggers one or more control data objects for risk mitigation to execute the task.

In an embodiment, the present invention provides a computer program product for risk management. The product includes a computer readable storage medium readable by a processor and storing instructions for execution by the processor for performing risk management method in supply chain.

In an advantageous aspect, the system and method of the present invention provides ability to overlay pieces of the structured data to arrive at risk data objects and control data objects for risk assessment and mitigation. Also, enables setup of automated risk management processes based on the nuanced category assessment. Like, automatic curation of a task aggregation algorithm, identification of appropriate data fields, generation of risk data objects and control data objects, automatic screening of responses, auto-identifying best fit scenarios for the given event and ongoing monitoring of task execution related risk through an application interface. Further, the system of the invention configures and receives risk alerts on a periodic basis to review assessment and make modifications or course corrections which help the system identify risk patterns specific to the task and enhance the automation flow through machine learning systems.

In an advantageous aspect, the present invention utilizes Machine Learning algorithms, prediction data models, and recommendation algorithms for data processing and analysis.

BRIEF DESCRIPTION OF THE DRAWINGS

The disclosure will be better understood and when consideration is given to the drawings and the detailed description which follows. Such description refers to the annexed drawings wherein:

FIG. 3B is a table showing risk characteristic in an example scenario in accordance with an embodiment of the invention.

FIG. 3C is a table showing risk characteristic score in an example scenario in accordance with an embodiment of the invention.

FIG. 3D shows a table providing interaction factor of supplier inherent risk in accordance with an embodiment of the invention.

FIG. 4C is a table depicting risk assessment result mapping in accordance with an embodiment of the invention.

FIG. 4D is a table depicting a control effectiveness rating, weight, and overall rating scale.

FIG. 4E is graph depicting a residual risk for risk characteristics.

DETAILED DESCRIPTION

Figure 1:
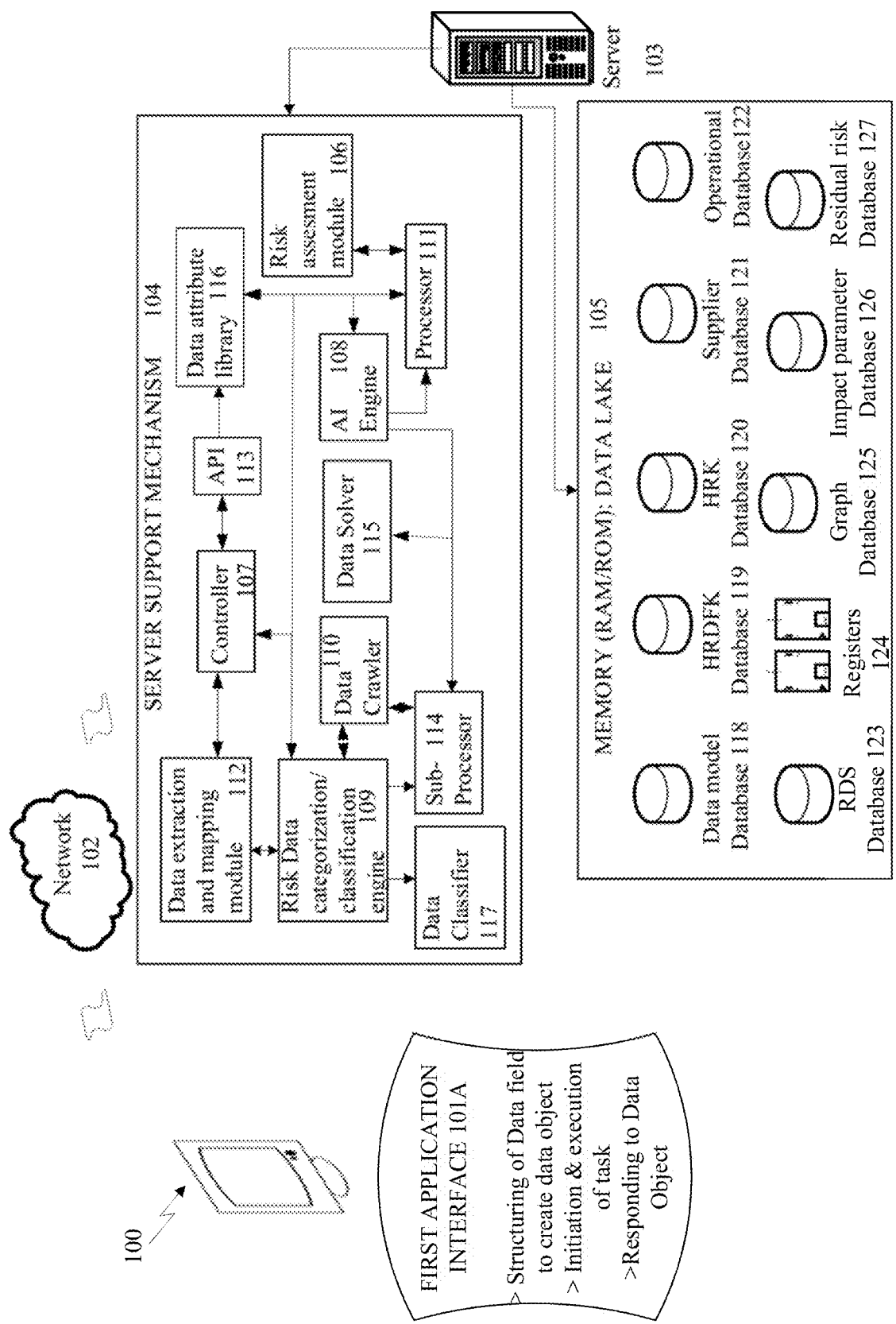
FIG. 1 is a view of a risk management system in accordance with an embodiment of the invention.

Described herein are the various embodiments of the present invention, which includes method and system for risk management in supply chain.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "risk characteristic," "risk data objects," or "control data objects," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for risk management in supply chain.

Referring to FIG. 1, a system 100 for risk management is provided in accordance with an embodiment of the present invention. The system 100 includes at least one entity machine 101 with application user interface 101A for sending, receiving, modifying or triggering processing of risk characteristic data over a network 102. The system 100 includes a server 103 configured to receive data and instructions from the entity. The system 100 includes a support mechanism 104 for performing risk management related to any supply chain task/process with multiple functions including risk data extraction, classification and structuring of data attributes for analysis of data, creation of data models configured to process different parameters including supplier data, impact data, historical data, etc. The system 100 includes a data store/data lake 105 for accessing historical risk related data from multiple sources including executed contracts, sourcing operations, inventory management operations etc., and storing plurality of training models created by support mechanism 104.

In an embodiment the server 103 of the invention may include various sub-servers for communicating and processing data across the network. The sub-servers include but are not limited to content management server, application server, directory server, database server, mobile information server and real-time communication server.

In an embodiment the entity machine 101 may communicate with the server 103 wirelessly through communication interface, which may include digital signal processing circuitry. Also, the entity machine 101 may be implemented in several different forms, for example, as a smartphone, computer, personal digital assistant, or other similar devices.

In an exemplary embodiment, the application user interface 101A of the entity machine 101 enables cognitive computing to improve interaction between user and the supply chain risk management application(s). The interface 101A improves the ability of a user to use the computer machine itself. Since, the application interface 101A provides actionable insights into various risk characteristic data related to execution of supply chain task operations. The application interface 101A triggers a plurality of predictive data models to identify one or more risk data fields associated with the task to be executed. By eliminating multiple layers, processing tasks and recordation of information to get a desired risk data object or risk management functionality, which would be slow, complex and impractical to learn, particularly to a user without deep knowledge of the subject, the application user interface 101A is more user friendly and the risk management system improves the functioning of the existing computer systems.

In an example embodiment, the support mechanism 104 of the system 100 includes a control interface for accessing supply chain task related information received at the server 103. The support mechanism 104 further includes a risk assessment module 106 triggered through the application interface 101A of the entity machine 101 for determining risk characteristic based on requirements for execution of the received task at the server 103.

The support mechanism 104 includes a verification engine for verifying/identifying if the response to a data object is received from an entity or triggered by the system through a bot and is auto generated. The mechanism 104 further includes a controller 107 encoded with instructions, enabling the controller 107 to function as a bot for enabling an AI engine 108 to predict an inherent risk associated with execution of a SCM task based on a response to one or more risk data objects received at the server 103. The bot analyzes the response to each of the one or more risk data objects for determining risk characteristics. The AI engine 108 is also configured for enabling generation of a plurality of data script depending on the multiple data models for fetching data. The mechanism 104 includes risk data categorization/classification engine 109 for categorizing risk related data, risk data objects, and control data objects. The support mechanism 104 also includes a data crawler 110 for identifying relevant information from various sources including news feeds, contracts, supplier data on web etc., and providing the relevant information to the risk management system for restructuring the risk data objects and control data objects in real time, thereby ensuring appropriate risk data is processed for accurate decisions. The mechanism 104 also includes a processor 111 configured for performing various functions including but not limited to selecting appropriate data field attributes, identifying positioning of the data field attributes, processing risk data object based on multiple data models for predicting inherent risk in a supply chain management (SCM) operation etc. The AI engine 108 is coupled to the processor 111 for identifying one or more risk data fields associated with execution of the SCM task. The mechanism 104 includes a data extraction and mapping module 112 configured for extracting and mapping risk data fields, risk data objects, control data fields and control data objects to a reference parameter like category by a data script generated through the AI engine 108. The mechanism 104 includes an API 113 for triggering multiple data models through the processor 111 for carrying out the risk management at multiple instances of SCM operations. Since, supply chain operations include multiple sub-functions within main functions such as the sourcing operation includes supplier recommendation etc., the support mechanism 104 includes sub-processors 114 for simultaneously carrying out multiple risk prediction associated with the sub-functions of the SCM task. The mechanism 104 also includes a data solver 115 configured for operating with data scripts to accomplish structuring of data field on the interface.

In an embodiment, the support mechanism 104 includes a data attribute library 116 configured to enable comparison of extracted data fields data attribute with the library 116 to detect presence or absence of certain attributes and deviations from a standard risk data object response template in the library 116. The deviations are analyzed to generate a risk score for quantifying the risk involved for an entity on execution of the SCM task. Also, one or more dynamic weights are assigned to the data attributes for generating the risk score.

In an embodiment, the support mechanism 104 includes a data classifier 117 trained with a normalized taxonomy used as an output in a supervised learning setting. This data classifier 117 is also used as a category encoder as a category space learned by this classifier captures a separable space. To perform a data field discovery, all the data belonging to a category of the task to be executed is encoded through its corresponding data classifier.

In an exemplary embodiment, the AI engine 108 is coupled to the controller 107 encoded with instructions enabling the controller 107 to function as a bot for enabling the AI engine 108 to predict an inherent risk associated with execution of the task based on a response to the risk data objects received at the server. The bot analyzes the response to each of the one or more data objects for determining risk characteristics. It shall be understood to a person skilled in the art that the response to the risk data objects may be from an entity or auto generated response from the AI engine 108 through the application.

In an exemplary embodiment, the AI engine 108 of the system is also configured to execute rule-based operations as a rule engine. The rule engine increases speed of implementation, enables management of diverse type of risks and resolution of conflicting scenarios while assessing risks. The rule engine includes a compiler configured for processing the SCM task and a code module configured for generating a plurality of protocols based on the task, a plurality of metadata, one or more risk data objects, one or more control data objects, and one or more data models associated with one or more risk data fields wherein the protocols are generated for executing the task based on an AI based processing logic. The controller 107 is coupled to the rule engine and enables prediction of an inherent risk associated with execution of the task based on a response to the risk data objects received at the server 103 and triggers one or more control data objects for risk mitigation to execute the task. The rule engine controls execution of the SCM task as the code module generates a code to prevent execution of the task in response to determination of the inherent risk and supplier risk being above a risk threshold. The rule engine enables setting up of rules via API. The AI engine 108 integrates deep learning, predictive analysis, information extraction and robotics for processing the task.

In an embodiment the meta data includes document group (e.g., master data management), document type (e.g., item), risk data objects associated with corresponding document type (e.g., create item), rule category associated with the risk data objects (e.g., Validation and approval).

In example embodiment the server 103 shall include electronic circuitry for enabling execution of various steps by the processor 111. The electronic circuitry has various elements including but not limited to a plurality of arithmetic logic units (ALU) and floating-point Units (FPU's). The ALU enables processing of binary integers to assist in formation of at least one table of data attributes where the risk characteristic data model (RCDM) or either similar data models are applied to the data table for obtaining risk score for execution of the task. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low speed interface connecting to low speed bus and storage device. Each of the components of the electronic circuitry, are interconnected using various busses, and may be mounted on a common motherboard or in other manners as appropriate. The processor 111 can process instructions for execution within the server 103, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank or a multi-processor system).

In an example embodiment, the system of the present invention includes a front-end web server communicatively coupled to at least one database server, where the front-end web server is configured to process the task based on a plurality of scripts by receiving the risk data fields and control data fields and applying an AI based dynamic processing logic to automate at least one supply chain task.

The processor 111 may be implemented as a chipset of chips that include separate and multiple analog and digital processors. The processor 111 may provide coordination of the other components, such as controlling user interfaces, applications run by devices, and wireless communication by devices.

The Processor 111 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor 111. In addition, an external interface may be provided in communication with processor 111, so as to enable near area communication of device with other devices. External interface may provide, for example, for wired communication in some implementations, or for wireless communication in other implementations, and multiple interfaces may also be used.

In an embodiment, the present invention uses GPUs (Graphical processing units) for enabling AI to provide computing power to processes humongous amount of data for identifying the risk data fields and generating the risk data objects.

In an exemplary embodiment, the Artificial intelligence (AI) engine 108 employs machine learning techniques that learn patterns, reasoning, generate insights from risk management data. Further, the AI engine 108 with ML employs deep learning that utilizes artificial neural networks to mimic biological neural network in human brains. The artificial neural networks analyze data to determine associations and provide meaning to unidentified data.

In another embodiment, the invention enables integration of Application Programming Interfaces (APIs) 113 for plugging aspects of AI into the risk management application including risk assessment and mitigation.

Referring to FIG. 1, the various elements like the support mechanism 104 and the data lake/memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the data lake/memory data store 105 either alone or in various combinations may be part of a server system as other external connections.

In an example embodiment, the data lake/memory data store 105 includes plurality of databases as shown in FIG. 1. The data lake/data store 105 includes a data model database 118 storing one or more risk data models relevant to the data attribute of risk data objects for extracting risk data field from historical risk data field knowledge database 119. The historical risk data field knowledge database 119 stores a plurality of risk data fields processed by the AI engine 108 based on a plurality of risk parameters and the one or more data models to generate the risk data objects. The data lake includes a historical risk knowledge database 120 configured for storing a plurality of historical risk data for enabling the bot to respond to the risk data objects where, a backend risk data script created by the bot enables automation of risk assessment for the SCM task. The data lake 105 includes a supplier database 121 configured to store data of one or more suppliers recommended by the AI engine 108 based on risk characteristics wherein the suppliers are identified based on a plurality of factors including financial performance and risk ratings, revenue details, Supplier operational category, financial stability, spend data, client servicing, logistics, lead times, market fragmentation, capacity constraints, certifications, incumbent status, currency fluctuations and political risks. The data lake 105 includes an operational database 122 configured for storing a set of parameters identified from a received SCM task for initiating a risk assessment. The data model database 118 includes a category specific risk data model (CSRDM) database, an entity specific risk data model (ESRDM) database and a switching risk data model script database (SRDMSD) configured for switching between (CSRDM) and (ESRDM). The data lake 105 also includes risk data script (RDS) database 123 for storing a plurality of risk data script generated by the AI engine 108 based on analysis of the task to be executed. The risk data script is generated based on prediction analysis, and deep learning performed on historical risk data field database 119. The data script includes a set of queries processed by dynamically generated AI based processing logic. The data lake 105 further includes a plurality of registers 124 as part of the memory data store 105 for temporarily storing data from various databases to enable transfer of data by the processor 111 between the databases as per the instructions of the AI engine 108 to execute the task. Further, the data model database 118 is configured for storing a plurality of training data models required to fetch data attributes for generating one or more risk data object on the interface based on the task. The data lake 105 includes a graph database 125 configured for storing graphical data model where multiple criterion such as risk associated with entity line of business and risk related to suppliers operating region can be used as additional filters to identify relevant and secured execution of the task. The data lake 105 also stores key performance indicator (KPI) information about existing suppliers in the supplier database 121 and the information available in the historical knowledge databases related to past contracts, execution and compliance with legal obligations under the contracts etc. The information related to compliance with obligations in the past is utilized for risk assessment in awarding the contract to a supplier. The data lake 105 also includes a real-time updated impact parameter database 126 configured for storing one or more impact parameters capable of modifying at least one of risk data object, supplier risk data object, inherent risk characteristic or the supplier risk characteristic. The data lake includes a residual risk database 127 configured for storing residual risk associated with execution of the task. The residual risk is determined based on the predicted inherent risk and an overall control data object assessment rating per risk.

In an example embodiment, the historical risk knowledge database 120 is a query bank with a feedback loop. The AI engine 108 keeps learning from the new data objects created every time and stores the data field in the bank. Depending on the nature of the task, the data field are identified, and the risk data object is auto populated and generated on the application interface. The set of data fields fetched from the query bank are based on the requirement and may be influenced by certain dynamically changing impact parameters. The AI engine 108 fetches the data field from the bank to create the risk data objects based on data script generated by the bot for processing the requirement.

In an embodiment, the system retrieves one or more suppliers from the supplier database 121 based on a plurality of factors including financial performance and risk ratings, revenue details, financial stability, spend data, client servicing, logistics, lead times, market fragmentation, capacity constraints, certifications, incumbent status, currency fluctuations and political risks.

In an exemplary embodiment, the present invention collates and scrubs data from one or more internal and external databases including ERPs, Vendor Management Systems, Newsfeeds from top Industry Sources, Market Indices, Demand Management and Inventory Management Systems for data analysis to predict risk associated with execution of a SCM task.

In an embodiment, the processing logic for identifying one or more risk data objects or control data objects, is sequential or parallel or switching based processing of the data attributes for generating the risk data script to ensure faster processing of the task. The switching-based processing logic includes dynamic identification of a path for processing of the task based on the risk data script and determination of multiple data attributes dependent on each other.

The risk data script is generated based on one or more risk data models trained through natural language processing (NLP) of a historical dataset with logistic regression and median calculations to predict inherent risks in execution of the task. Further, the inherent risk enables prediction of one or more control data objects and most effective mitigation. The risk data scripts adapt processing logic to each sub parameter like category, enabling changing risk assessment parameters and tool over time. The AI engine 108 prediction caters to the possibilities of being selected by a user and average risk assessment.

In an embodiment, the graph database 125 is configured to store graph structures for semantic queries with nodes, edges and properties to represent and store data. The graph database includes nodal connections of similar data values wherein data associated with the SCM task is added to the graph database for identifying related datasets wherein a connection of the SCM task associated data with the related dataset in a historical risk database is formed if a node in the graphical database with values similar to the SCM task associated data is present else a new node for the SCM task associated data is formed.

In an embodiment, the risk assessment is determined based on data points including evaluation of risks associated with operational objectives, third party engagements, compliance obligations, analysis of historical performances, consolidation of volumes across geographies, business units, product and service categories, and current inventory management practices.

In an embodiment, the category specific risk data model (CSRDM) is generated by analyzing the plurality of risk data from the historical risk knowledge database 119 where the database 119 includes the plurality of risk data extracted from data sources such as past risk data objects, executed contracts by one or more entities etc.

The memory data store may be a volatile, a non-volatile memory or memory may also be another form of computer-readable medium, such as a magnetic or optical disk.

The memory store may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The risk management system enables more secured process considering the issues inherent with cloud environments.

In an embodiment, the entity or user includes a client, a risk manager, one or more operation of an Enterprise application automatically generating a task request based on execution of the operation like expiry of an existing contract, direct sourcing request or occurrence of any such operation triggering the application to generate the request for executing a task.

In an exemplary embodiment, the invention evaluates leading indicators in the market applicable for a Category in conjunction with correlated factors to provide predictions on risk associated with changes in material costs, product margins, supply constraints, supplier financial risk, etc. to enable secured execution of the tasks.

Figure 1A:
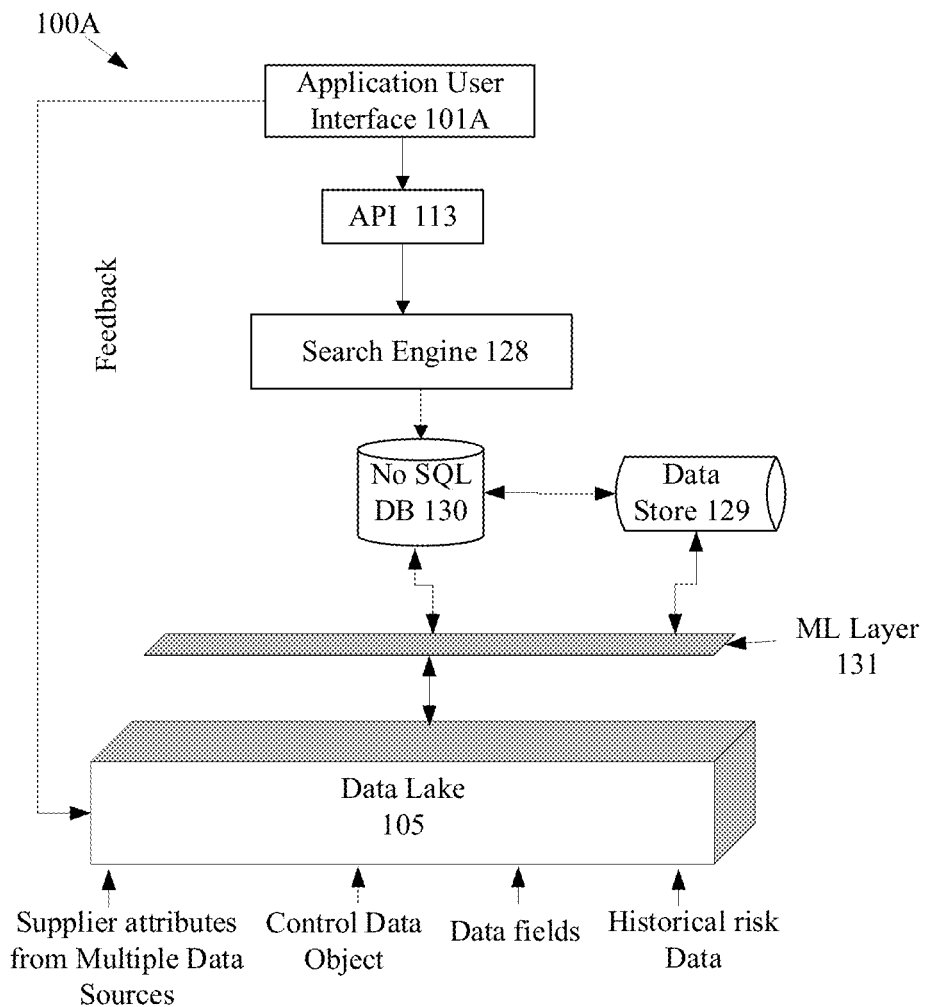
FIG. 1A is a system support architecture for risk assessment in accordance with an embodiment of the invention

Referring to FIG. 1A a system support architecture for risk assessment is shown in accordance with an embodiment of the invention. The support architecture 100A includes application user interface 101A, API 113 for attribute and element extraction based on the task, No SQL search engine 128, No SQL Database 129 and the Data lake 105. The Data lake 105 provides a feedback on the interface 101A for risks assessed, control data objects for mitigation of the risks and probability of execution of the task with the assessed risk. The data lake 105 receives information related to supplier attributes from multiple data sources, crawled data from web related to supplier profile or newsfeed, data fields, control data objects, and outcomes and historical risk data. The data from the data lake 105 is fetched and processed by the processor 111 based on a script created by the AI engine 108. The architecture includes a data store 129 providing data to the No SQL DB 130 and a machine learning ML Layer 131 above the data lake for processing the data. The AI engine 108 coupled to the processor 111 where, a bot enables processing of the data in the data lake 105 by generating a code related to the script for risk assessment. Further, the system of the invention provides an AI based mapping script for mapping SCM task with Categories and data fields. The mapping script enables unsupervised data field discovery. The invention also performs item to category mapping. The category mapping is performed through a bot by processing a mapping script to map item to category. Even in case of a new item not previously processed, the script is configured to identify characteristics associated with the item and map it to the category or create a new category by processing through the AI engine 108. The support architecture for risk assessment includes fetching information from executed contracts. The architecture may further include convolutional neural network (CNN), data structuring block for data extraction and training models to perform SCM tasks. For e.g.; the architecture enables performance of read/write extracted data attributes and data elements from executed contracts for training models and fetching KPI information and other required risk data information associated with execution of task through the SCM application.

Figure 2:
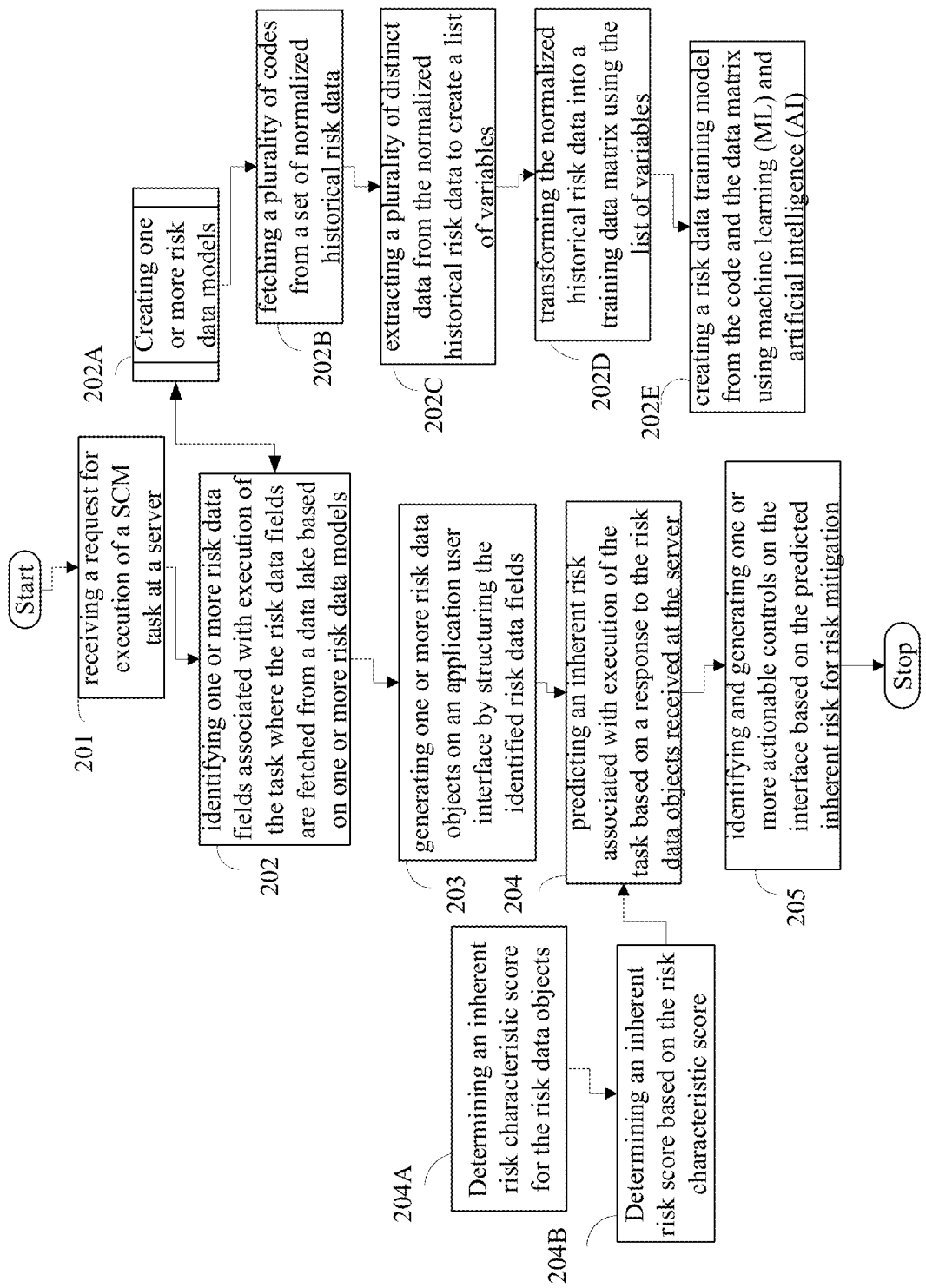
FIG. 2 is a flowchart depicting a method of risk management in accordance with an embodiment of the invention.

Referring to FIG. 2, a flowchart 200 depicting a method of risk management is provided in accordance with an embodiment of the present invention. The method includes the steps of 201 receiving a request for execution of a SCM task at a server, in step 202 identifying by an AI engine coupled to a processor, one or more risk data fields associated with execution of the task wherein the risk data fields are fetched from a data lake based on one or more risk data models. The risk data models are created in step 202A by fetching a plurality of codes from a normalized data set in step 202B. In step 202C, extracting a plurality of distinct data from the normalized data set to create a list of variables, in step 202D transforming normalized historical risk data into a training data matrix using the list of variables and in step 202E creating the risk training model from the code and the data matrix using machine learning (ML) and artificial intelligence (AI). The method includes the step 203 of generating one or more risk data objects on an application user interface by structuring the identified risk data fields wherein a bot is configured to create a data script based on the SCM task, the one or more data models and AI processing for structuring the risk data fields to generate the one or more risk data objects. In step 204, predicting an inherent risk associated with execution of the task based on a response to the risk data objects received at the server wherein the bot analyzes the response to each of the one or more risk data objects for determining risk characteristics to predict the inherent risk. For determining the inherent risk, in step 204A determining the inherent risk characteristic score for the risk data objects. In step 204B, determining an inherent risk score for the risk data objects. In step 205, identifying and generating one or more actionable controls on the interface based on the predicted inherent risk for risk mitigation. The actionable controls are one or more control data objects with structured control data fields impacting execution of the task.

Figure 3A:
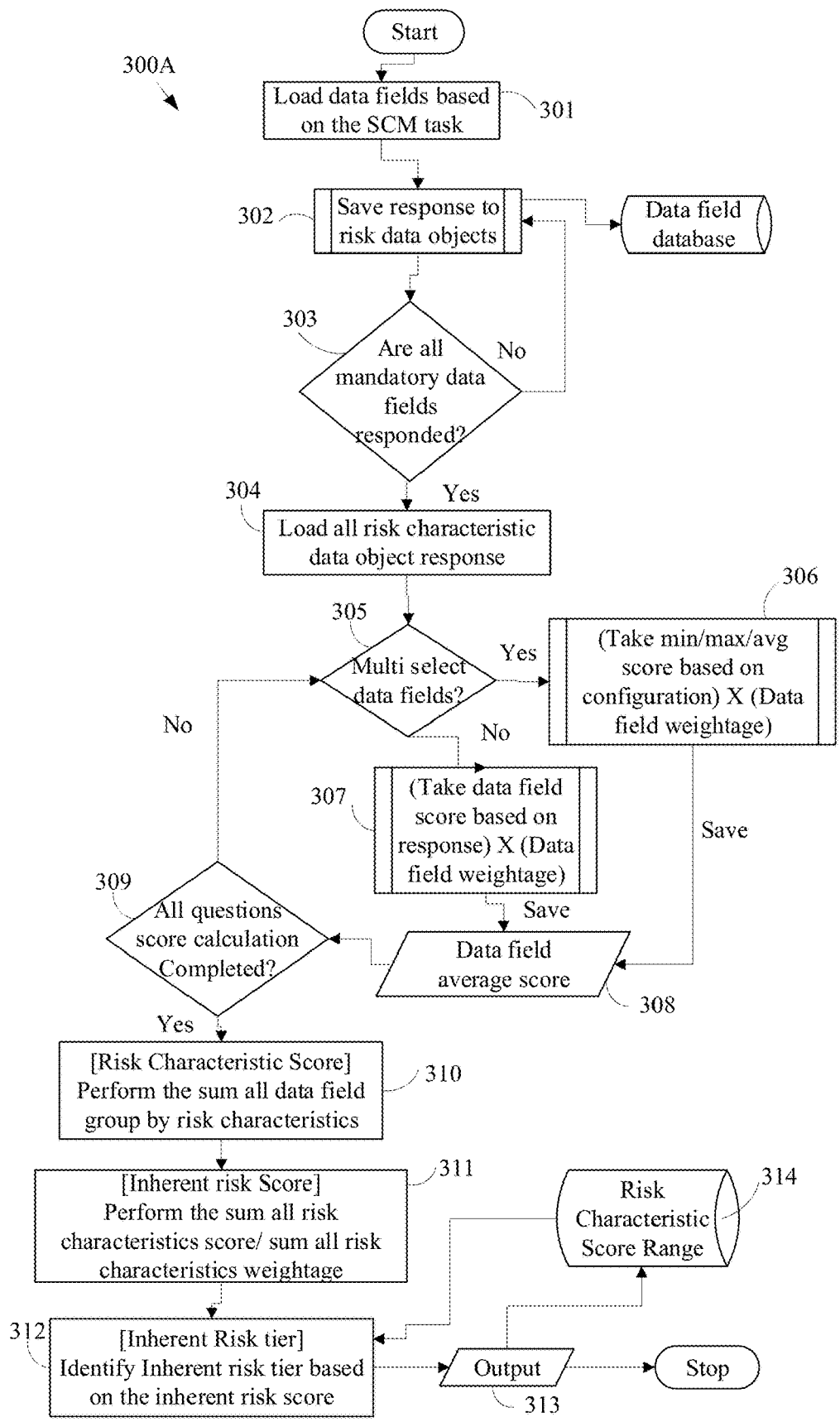
FIG. 3A is a flow diagram depicting a method of determining inherent risk characteristics in an example scenario in accordance with an embodiment of the invention.

Referring to FIG. 3A a flow diagram 300A depicting a method of determining inherent risk characteristics in an example scenario is provided in accordance with an embodiment of the invention. The method includes step 301 of loading data fields based on the SCM task and saving in data field database one or more response to risk data objects received from a user or auto-response received from a bot in step 302. In step 303, checking if all mandatory data fields have been checked, if yes then in step 304 load all risk characteristic data object, else go to step 303. In step 305, checking if there are multi-select data fields, if yes, then in step 306 determining (Take min/max/avg score based on configuration)×(Data field weightage), else in step 307 (Take data field score based on response)×(Data field weightage). In step 308 determining the data field average score. In step 309, checking if all questions score calculation completed, if no, then go back to step 305 else, if yes, then in step 310, determining risk characteristic score by performing sum of all data field group by risk characteristic. In step 311, determining inherent risk score by performing sum of all risk characteristic score/sum of all risk characteristic weightage. In step 312 identifying inherent risk tier based on inherent risk score and giving an output in step 313. The output also enables determination of risk characteristic score range which also provides a feedback input for step 312 in determining the inherent risk tier.

In an embodiment, referring to table 300B of FIG. 3B, a risk characteristic in an example scenario is provided in accordance with an embodiment of the invention. The system enables prediction of inherent and residual Risk characteristic associated with execution of the task. Each risk characteristics has a decimal weightage. They are classified as risk category 1 or risk category 2 depending on the task to be executed. In an example, the risk category is an impact risk characteristic and category 2 is a probable or likely risk characteristic.

In an embodiment, referring to table 300C of FIG. 3C, a risk characteristic score in an example scenario is provided in accordance with an embodiment of the invention. Each risk characteristics calculation results are classified in various score range. As shown in table 300C, each score range includes From and to decimal numbers and unique code like color code for risk identification.

In an embodiment, an inherent risk characteristic score for the risk data objects is determined as:

$$Rs = \Sigma[(D_s * D_w)/D_{Tw}]$$

where, Rs is risk characteristic score;
$D_s$ is Min/Max/Average data field Score;
$D_w$ is data field weightage;
$D_{Tw}$ is Total Weightage of all data fields.

In another embodiment, an inherent risk score ($IR_s$) for the sourcing operation based on the inherent risk characteristic score is determined as:

$$IR_s = \Sigma[[R_{s1}/\Sigma R_{tw}] + [R_{s2}/\Sigma R_{tw}] + \ldots [R_{sn}/\Sigma R_{tw}]]$$

where, $R_{s1}$ is risk characteristic score for first data field of the risk data object;
$R_{s2}$ is risk characteristic score for second data field of the risk data object;
$R_{sn}$ is risk characteristic score for nth data field of the risk data object;
$R_{tw}$ is Total Weightage of all risk characteristics.

In an embodiment referring to FIG. 3D, a table 300D for deriving an interaction factor (IF) based on risk characteristic 1 and risk characteristic 2 is shown in accordance with an embodiment of the invention. The interaction factor is used for determination of the supplier inherent risk. Interaction factor (IF) is defined for each combination of risk characteristics (1 and 2). The Value of the IF can be up to 4 decimal places.

In an embodiment, an inherent Supplier risk characteristic score for the supplier risk data objects is determined as:

$$ISRs = \Sigma[(SD_s * SD_w)/\Sigma SD_{Tw}]$$

where, ISRs is risk characteristic score
$SD_s$ is Min/Max/Average supplier data field Score;
$SD_w$ is Supplier data field weightage;
$SD_{Tw}$ is Total Weightage of all Supplier data fields.

In an embodiment, a Supplier risk score based on the inherent Supplier risk characteristic score is determined as:

$$SR_s = \Sigma[[Max[R_{s1}, ISR_{s1}] * ISR_{s1} * IF_{s1}] + [Max[R_{s2}, ISR_{s2}] * ISR_{s2} * IF_{s2}] + \ldots [Max[Rsn, ISRsn] * ISRsn * IFsn]] + IRs$$

where, $R_{s1}$ is risk characteristic score for first data field of the risk data object;
$ISR_{s1}$ is risk characteristic score for first data field of the supplier risk data object;
$IF_{s1}$ is a first interaction factor for a risk characteristic combination of parameters;
$R_{sn}$ is risk characteristic score for nth data field of the risk data object;
$ISR_{sn}$ is risk characteristic score for the nth data field of the supplier risk data object;
$IF_{sn}$ is nth interaction factor for a risk characteristic combination of parameters;
$IR_s$ is Sourcing operation inherent risk score.

In an embodiment the inherent risk includes risk associated with one or more SCM operations including supplier management operation, Sourcing operations, inventory management operations, account payable operations, transportation management operations, and material management operation.

Figure 4A:
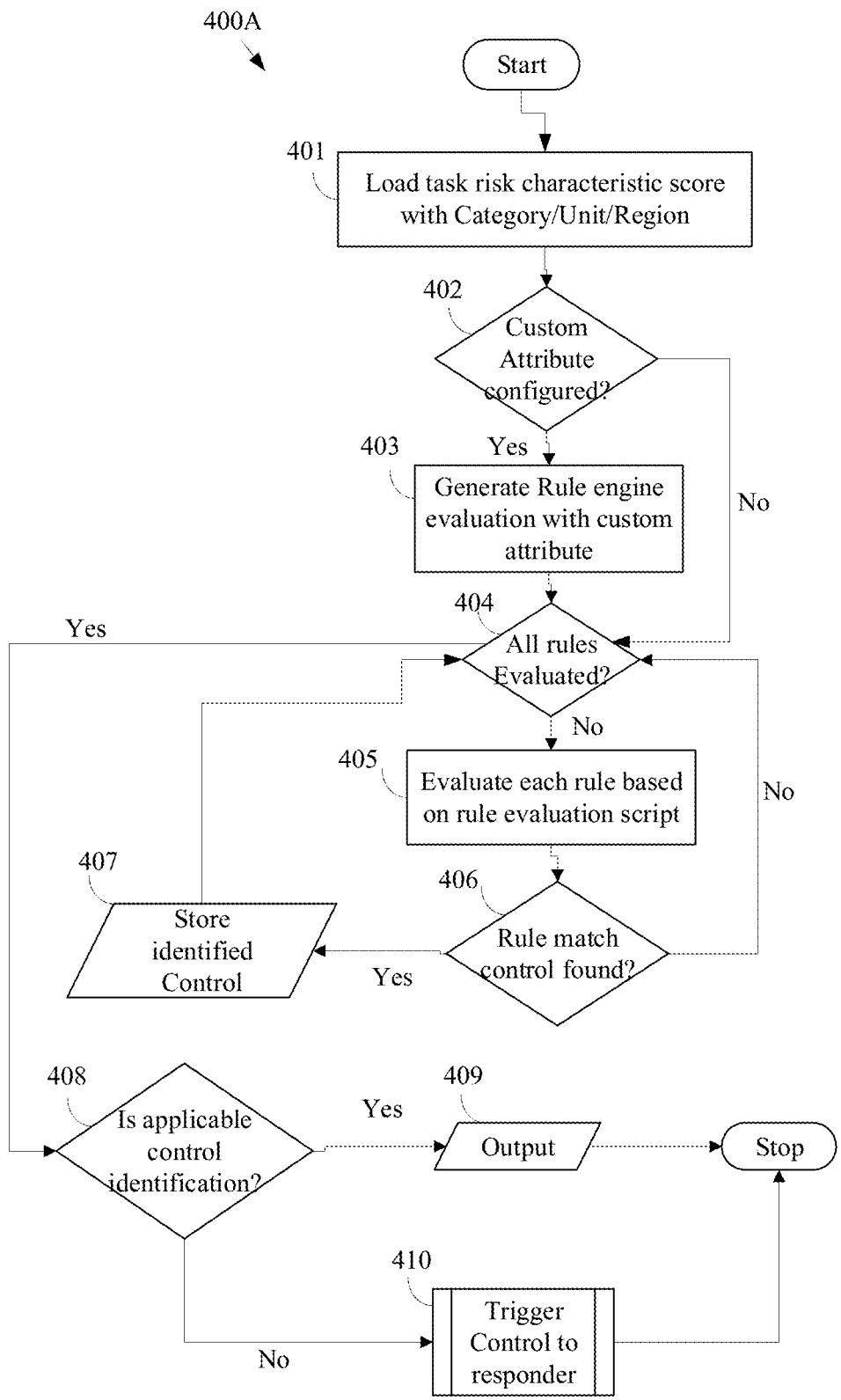
FIG. 4A is a flow diagram depicting identification of control data object in accordance with an embodiment of the invention.

Referring to FIG. 4A, a flow diagram 400A depicting a method of control data object identification is provided in accordance with an embodiment of the invention. The method includes the step 401 to load task risk characteristic score with Category/Unit/Region. In step 402 checking if custom data attribute is configured, if yes then in step 403 generating rule engine evaluation with custom data attribute, else in step 404 checking if all rules are evaluated. If all rules are not evaluated, then in step 405 evaluate each rule based on rule evaluation data script. In step 406 checking if rule match control is found, if yes, then in step 407 store identified control else, go back to step 404. If in step 404 all rules are evaluated, then checking if applicable control is identified in step 408. If control is identified then providing the output control data object in step 409 else, in step 410 trigger control to responder/user.

Figure 4B:
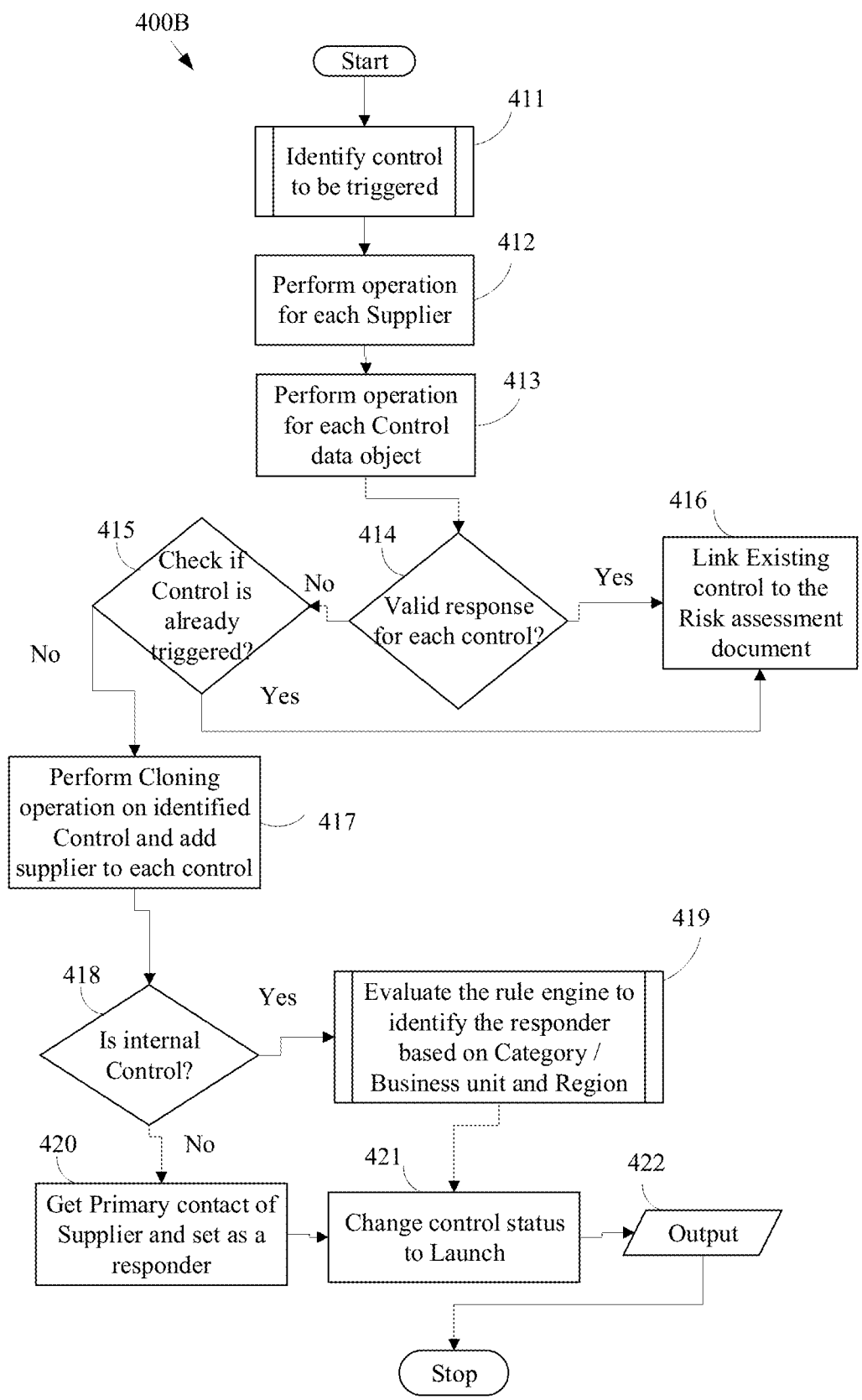
FIG. 4B is a flow diagram depicting triggering of control data object for supplier inherent risk in accordance with an embodiment of the invention.

Referring to FIG. 4B, a flow diagram 400B depicting a method of execution for control data object is shown in accordance with an embodiment of the invention. The method includes the step 411 of identifying control to be triggered and performing operation for each supplier in step 412. In step 413 performing operation for each control data object and in step 414 checking if a valid response for each control is received. If not, then in step 415 checking if control is already triggered. If the control is already triggered, then in step 416 linking existing control to the risk assessment document. If the control is not triggered, then in step 417 performing cloning operation on identified control and adding supplier to each control. In step 418, checking if internal control, if yes then in step 419, evaluating the rule engine to identify a responder/user based on category/region/unit, else if no, then in step 420 obtaining primary contact of supplier and setting it as a responder/user. In step 421, changing the control status to launch and providing the control data object in 422 as output to the user.

In an embodiment, the risk assessment process requires the evaluation and allocation of the result to the Control data object. Based on selected results other attributes are also assigned. As shown in table 400C of FIG. 4C, the result is mapped to Gap/Effectiveness/status and guidance. Each attribute provides more details on respective area of assessment.

In an embodiment, the invention includes an internal control data object and an external control data object. The internal control data object is generated on application user interface of a buyer user and the external control data object is generated on application user interface of a supplier user. The system receives a response to one or more supplier risk data objects from the buyer user and the supplier user for predicting a supplier risk. The one or more supplier risk data object is generated on application user interface of the buyer user by structuring one or more supplier data fields wherein a bot is configured to create a supplier data script based on the SCM task, the one or more data models, the predicted inherent risk and AI processing for structuring the supplier data fields to generate the one or more supplier risk data objects.

In an exemplary embodiment the present invention derives residual risk characteristic level bases on the results and gaps as shown in table 400C of FIG. 4C. For each inherent risk identified, the system determines the Residual Risk by combining the Inherent Risk Rating and the Overall Control Assessment rating. The Overall Residual Risk tier is determined as a weighted average of the residual risk rating of each risk characteristic.

In an exemplary embodiment, the risk data model of the invention for risk management includes the Risk Type (Risk Characteristic), Inherent Risk Rating (for each Risk Characteristic), Control Assessment Rating (for each control), Residual Risk Rating (for each characteristic), Overall Inherent Risk Rating, Overall Control Assessment Rating (per risk characteristic) and Overall Residual Risk Rating.

In order to determine the residual risk rating per risk characteristic, the invention first determines the Overall Control Assessment rating for each risk characteristic. Each control may be associated with one or more risk characteristic. If a control is associated with more than one risk characteristic, the control effectiveness score for that control is applied equally across all associated risk characteristics. Only controls that are deemed applicable to the relationship are utilized by the bot for determining the score. For each risk characteristic, the invention shall use a weighted average of the individual applicable control effectiveness ratings. The Overall Risk assessment rating is updated and reassessed once those control ratings are available. The Control Effectiveness Rating, Weight, and Overall Rating Scale is depicted in the table 400D as shown in FIG. 4D.

In addition to the weighted average determination, certain constraints are assessed and applied for determining the Overall Control Assessment Rating. The constraints include: (a) If an individual control is Ineffective, the overall control assessment can only be "Partially Ineffective" at best. (b) to have an overall "Highly Effective" control assessment rating, a risk should have at least two controls, one of which should behave as a supplemental control if the other control were to fail due to unforeseen circumstances. The Overall control assessment per risk ($C_{ar}$) is determined as:

$$C_{ar}=[(W_1 * NC_1)+(W_2 * NC_2)+\ldots(W_n * NC_n)]/TC_n$$

where, W1 is weightage of a first control;
$NC_1$ is number of controls with W1 weightage;
$W_2$ is weightage of a second control;
$NC_2$ is number of controls with $W_2$ weightage;
$W_n$ is the weightage of nth control;
$NC_n$ is number of controls with $W_n$ weightage;
$TC_n$ is total number of control data objects including $NC_1$, $NC_2$ and $NC_n$.

Referring to FIG. 4D, in an example scenario with 1 risk and 5 controls as 3 controls highly effective, and 2 control Partially ineffective, the overall control assessment per risk ($C_{ar}$) is $C_{ar}=[(0*3)+(4*2)]/5=1.6$ which is considered effective.

In another example scenario with 1 risk and 5 controls as 3 controls highly effective, 1 control partially ineffective and 1 control ineffective, the overall control assessment per risk ($C_{ar}$) is $C_{ar}=[(0*3)+(4*1)+(5*1)]/5=1.8$ which is considered ineffective due to presence of ineffective control data object.

In an embodiment for risk characteristic residual risk rating the invention determines the residual risk for each risk characteristic as depicted in graph 400E of FIG. 4E. For example, if the Inherent Risk Rating is "Tier 1" and the Overall Control Assessment Rating is "Ineffective", then the Residual Risk Rating is "Tier 1". However, if the Control Effectiveness Rating in this example changes to "Highly Effective", then the Residual Risk Rating becomes "Tier 4".

In an exemplary embodiment, the bot identifies certain inherent risks as "Sanctions Risk" and "Bribery Risk" which are not evaluated on a similar scale like five-point graduated scale of some other risks. For example, such inherent risks may be evaluated as being "present" or "not present". Likewise, the control effectiveness pertaining to these risks will be denoted as "effective" or "not effective". The residual risk is such scenarios may be evaluated as (a) "Tier 1" where the risk is "present" and the control effectiveness is "not effective"; or (b) "Tier 5" where the risk is "present" and the control effectiveness is "effective"; or (c) "Not present" where the risk is "not present". The Overall Residual Risk Rating is determined as the weighted average of all the individual residual risks.

Figure 5:
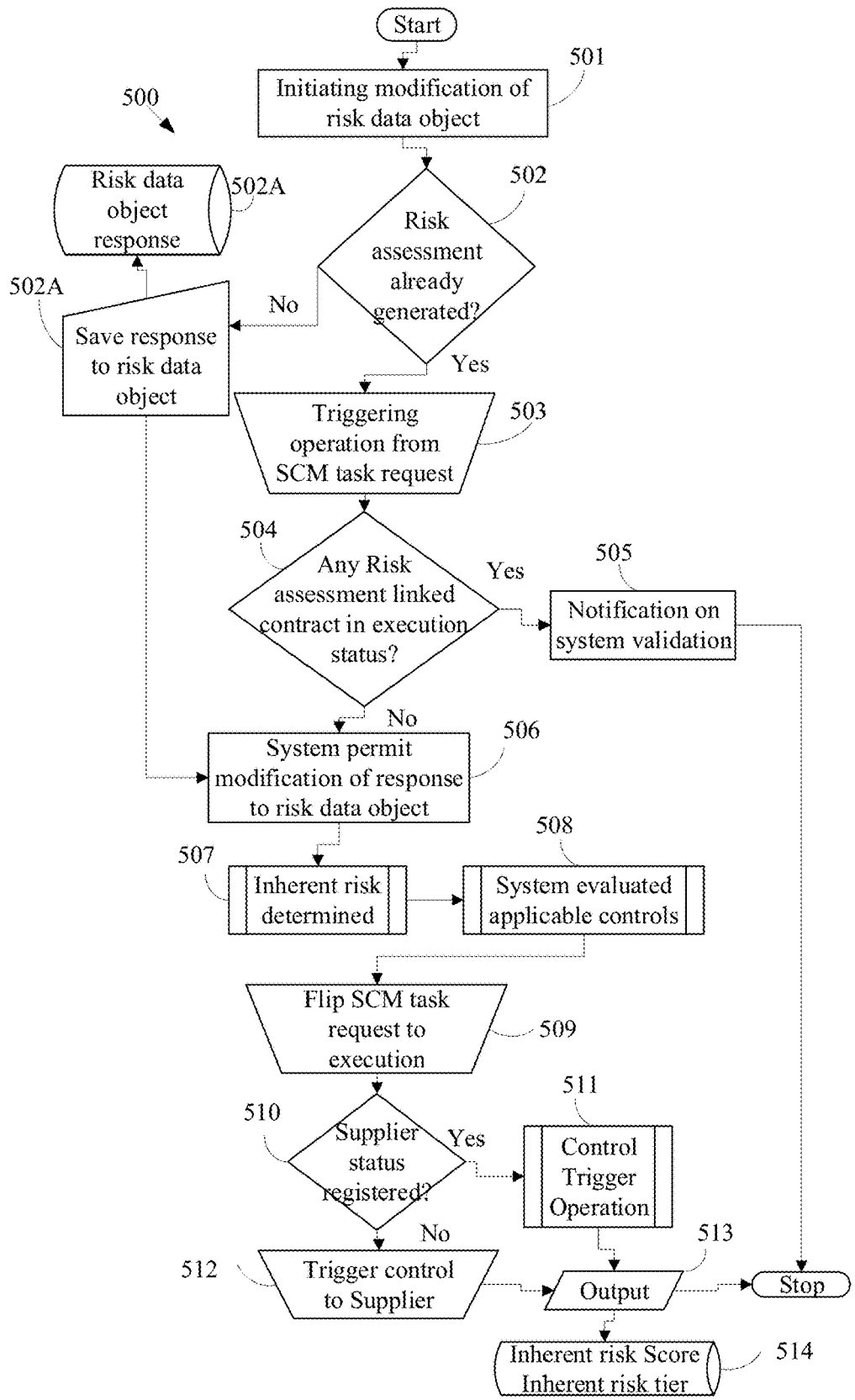
FIG. 5 is a flowchart depicting modification of existing task request intake risk form in an example scenario in accordance with an example embodiment of the invention.

Referring to FIG. 5 a flowchart 500 depicting method for modification of existing task request intake risk data object in an example scenario in accordance with an embodiment of the invention. The method includes the step 501 of initiating modification of the risk data object. In step 502 checking if risk assessment already generated, if no, then in step 502A saving response to risk data object in a risk object database 502B. If the risk assessment is already generated then in step 503, triggering operation from SCM task request. In step 504, checking if any risk assessment linked contract is in execution status, if yes, then in step 505 notification on system validation is issued, if no, then in step 506, system permits modification of response to risk data object and saves the modification. In step 507, inherent risk is determined, and system evaluates applicable control in step 508. In step 509, SCM task request is flipped to execution. In step 510, checking if supplier status is registered, if yes, then in step 511 control trigger operation is initiated else in step 512 triggering control to supplier. In step 513, providing the output and storing the inherent risk score and inherent risk tier information in step 514.

Figure 6:
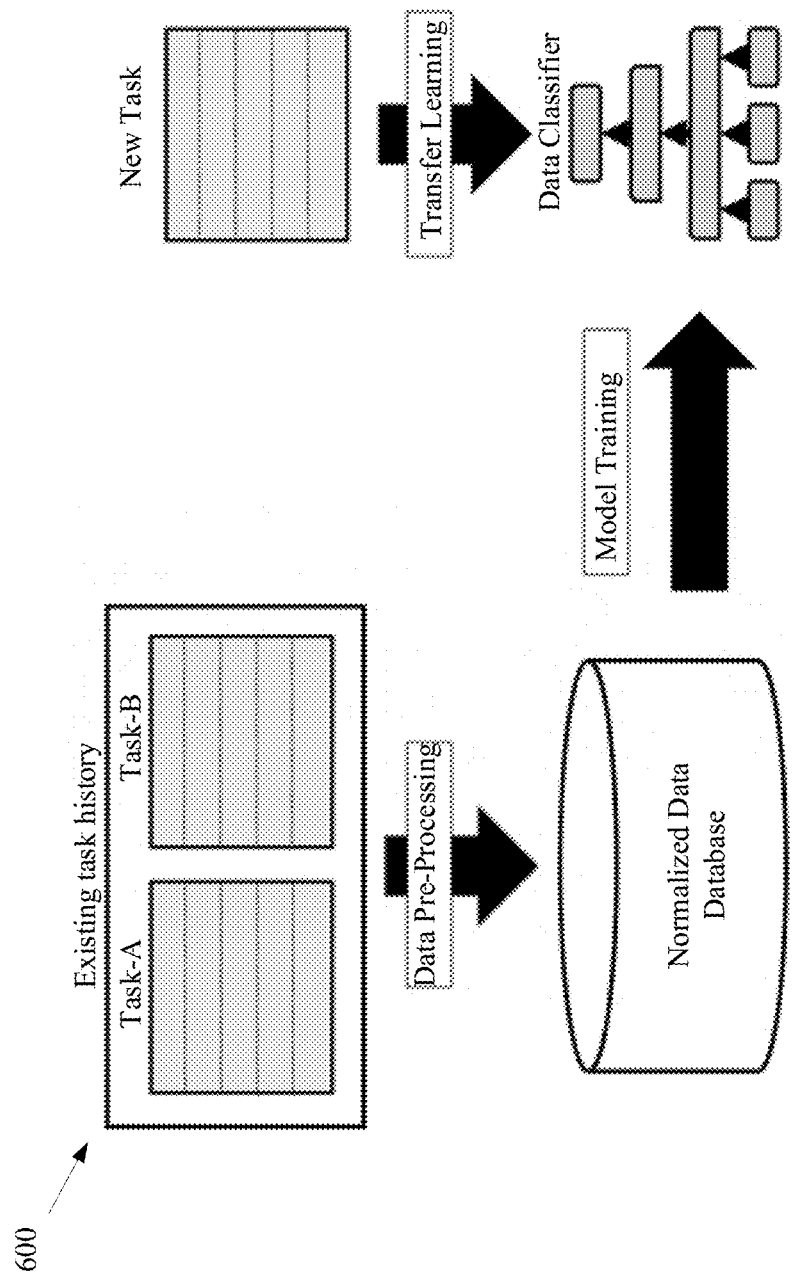
FIG. 6 is a data flow diagram for performing transfer learning on the data with a baseline model trained by pooling the data of all existing entities in accordance with an embodiment of the invention.

In an exemplary embodiment, data processing for the risk assessment and mitigation requires prediction of different types of risks based on underlining operational parameters of any SCM task. Moreover, identification of the possible risk factors and their precise control data objects requires appropriate data classification, processing and management at the database level. For example, classifying risk characteristic data without any supervision could lead to poor performance and many misclassifications. As a trade-off between the two approaches, transfer learning is used to ensure good performance of data classification. This is achieved by performing a sampling of risk data associated with a new task where samples with a diverse set of vocabulary are picked by the AI engine for annotation. Using this data, the data classifier is fine-tuned over the annotated dataset resulting in good performance over the remaining dataset. An intuitive representation 600 of performing transfer learning is shown in FIG. 6.

Figure 7:
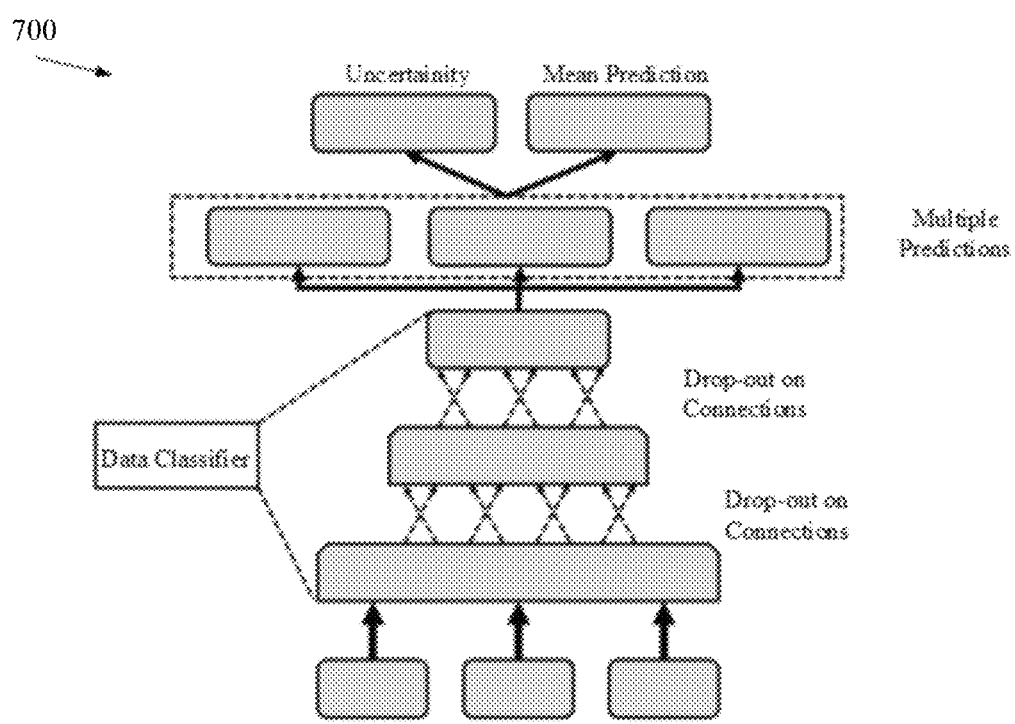
FIG. 7 shows data flow diagram of dropout in a data classifier in accordance with an embodiment of the invention.

In an embodiment, risk characteristic can be large, and it is crucial to get the model confidence of classification. Traditional deep neural networks are trained under a maximum likelihood framework and do not provide a confidence score. To address this problem, dropout in the model is used as approximation. By using dropout during model inference with multiple runs through the network, the variance in the estimates of the model can be used as a measure of uncertainty in the model. Samples with low confidence are marked by the system for inspection and correction. An overview of using dropout is shown by flow diagram 700 in FIG. 7.

Figure 8A:
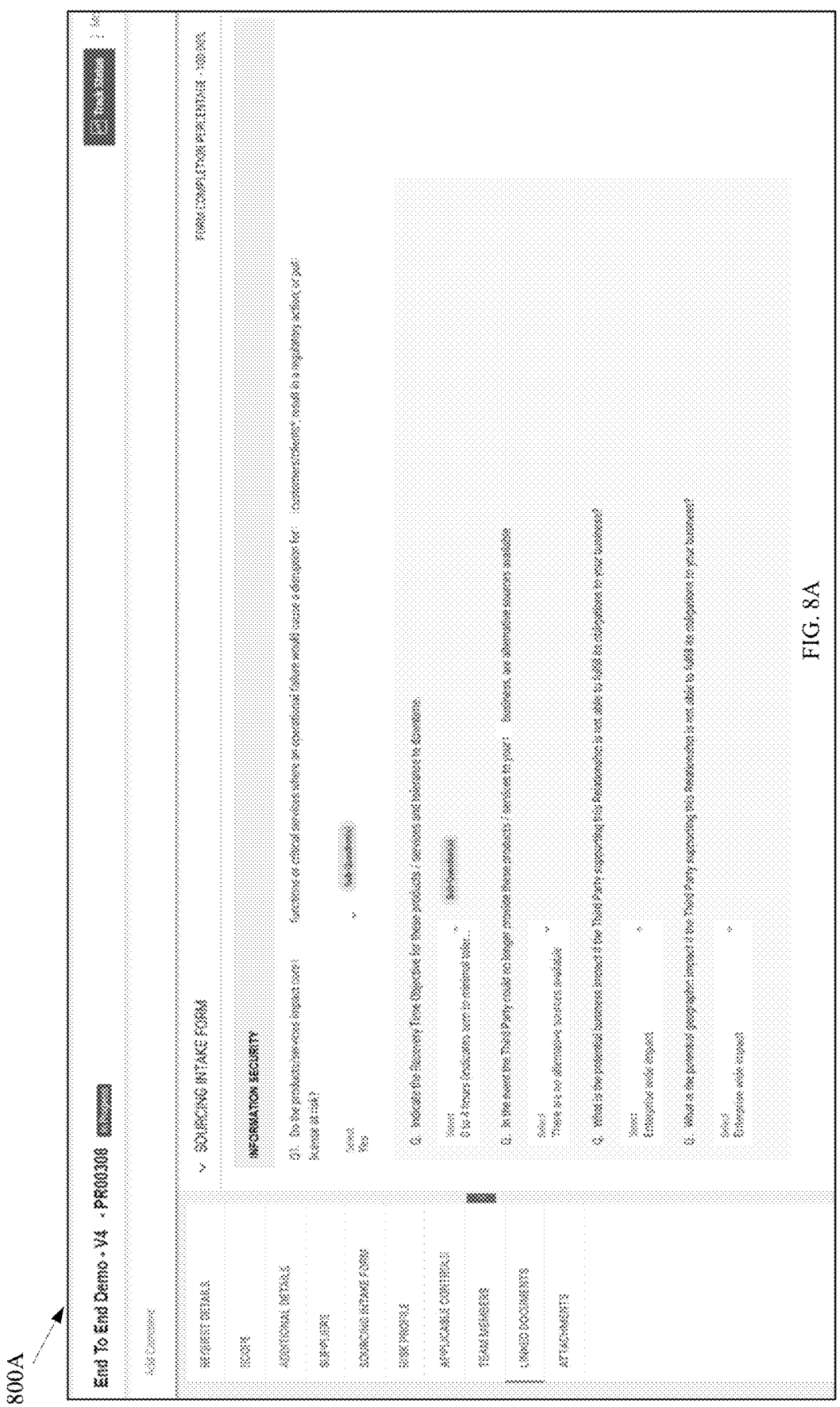
FIG. 8A shows a risk management application user interface with a risk data object related to sourcing task of SCM in accordance with an example embodiment of the invention.

In an embodiment, the invention includes risk assessment associated with source to contract at various stages of the processes. Referring to FIG. 8A-8F, a risk management application user interface is shown in accordance with an embodiment of the invention. Based on the SCM task a plurality of data fields is fetched from the data lake to structure one or more risk data objects on the interface. Referring to FIG. 8A, an application user interface 800A with a risk data object is shown in accordance with an example embodiment of the invention. In response to a request for sourcing an item in information security services, a risk data model operating as per category of the task to fetch data fields and generate the risk data object on the interface. The data fields are pertaining to risk related query and a response to the query is made through a bot based on backend script. Alternately, the cognitive interface receives a response from a user to one or more of these risk data fields. Based on evaluation of the response, inherent risk is predicted by the risk management system. Also, applicable controls for risk mitigation are determined.

Figure 8B:
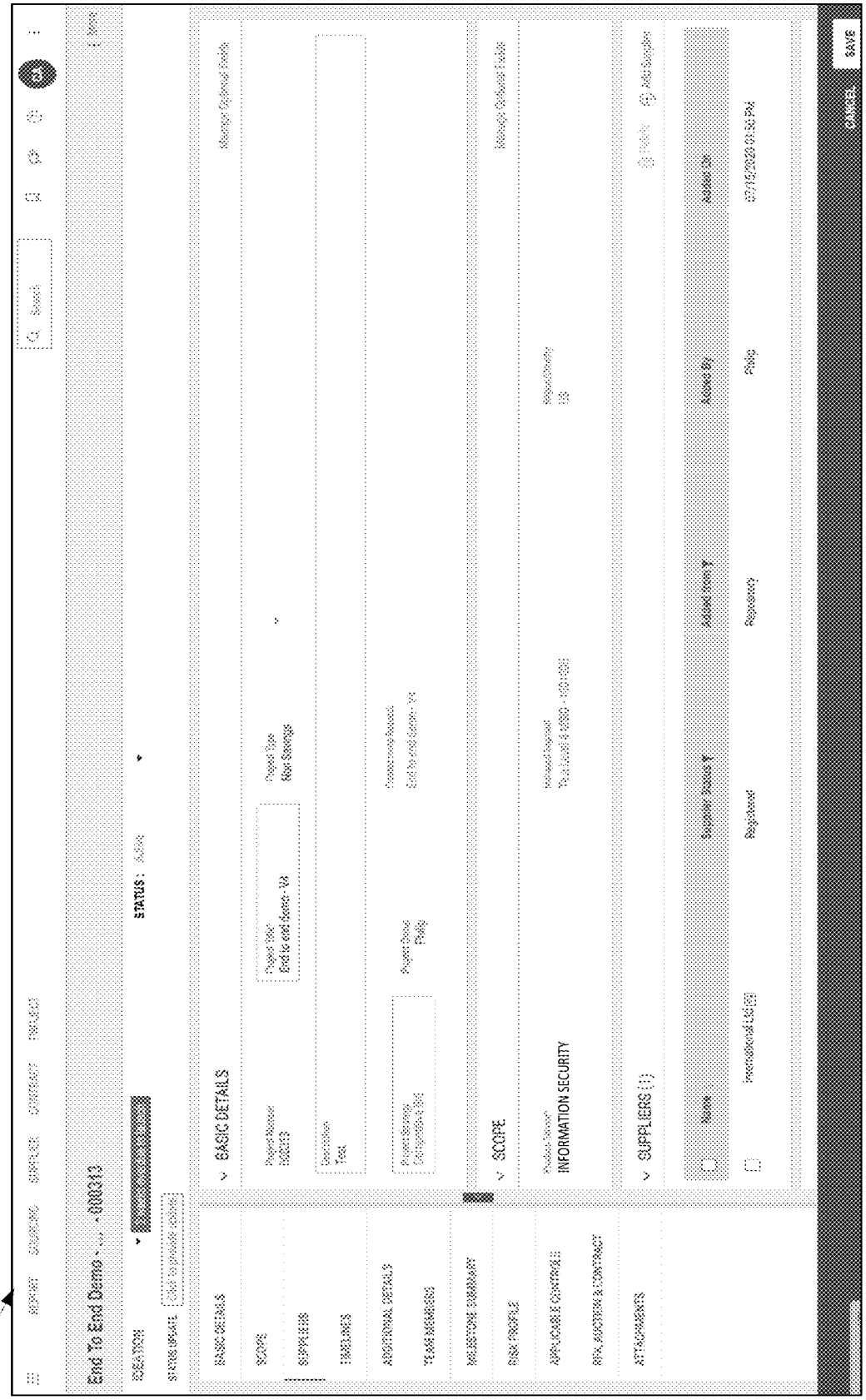
FIG. 8B shows an application user interface after flipping a task into a Project RFx for execution is shown in accordance with an example embodiment of the invention.
Figure 8C:
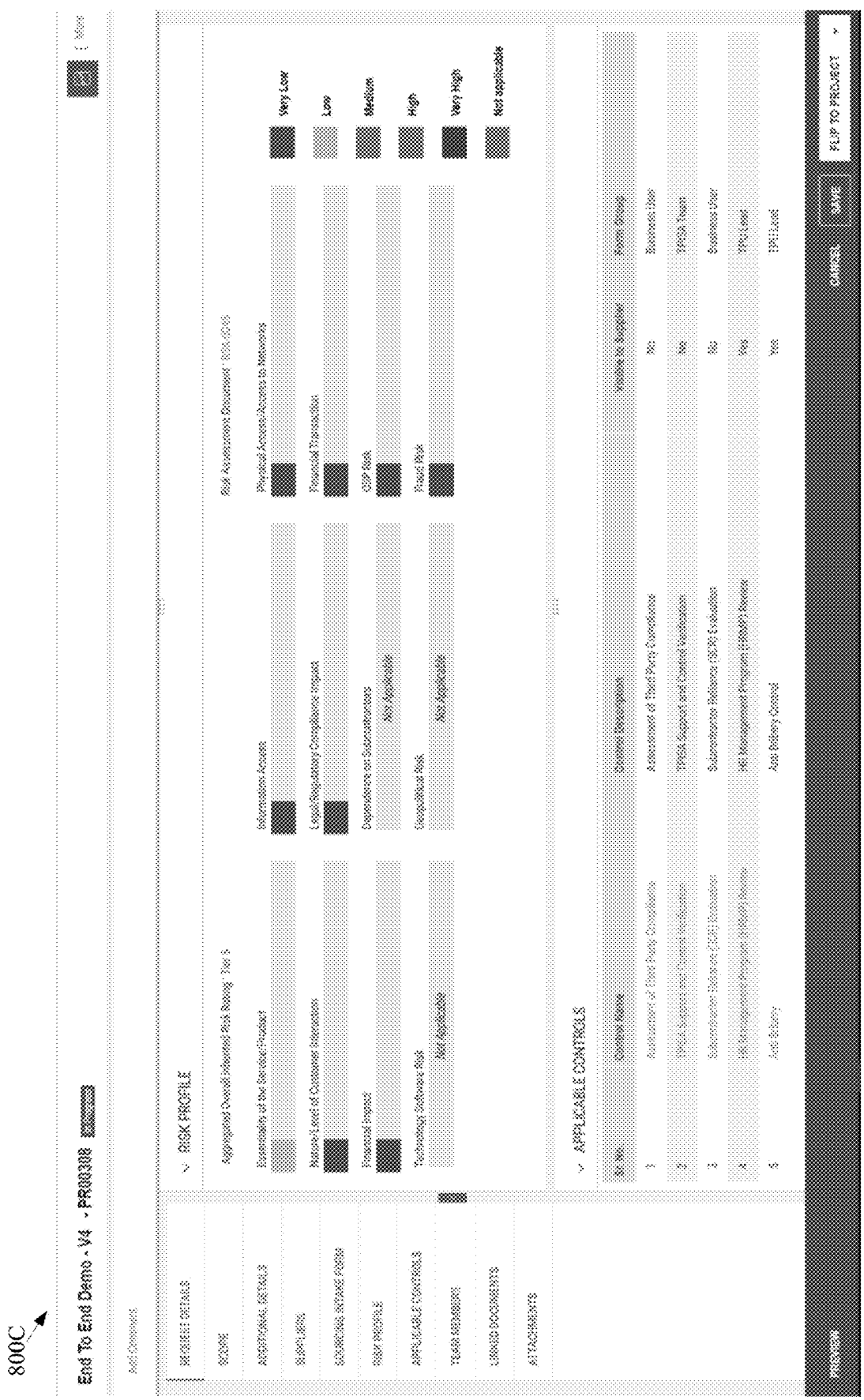
FIG. 8C shows an application user interface with control data objects for risk mitigation in accordance with an example embodiment of the invention.

Referring to FIG. 8B, an application user interface 800B after flipping a task into a Project RFx for execution is shown in accordance with an embodiment of the invention. Once, the task is initiated for execution after determining the inherent risk, the applicable controls for risk mitigation are also shown in the interface 800C of FIG. 8C.

Figure 8D:
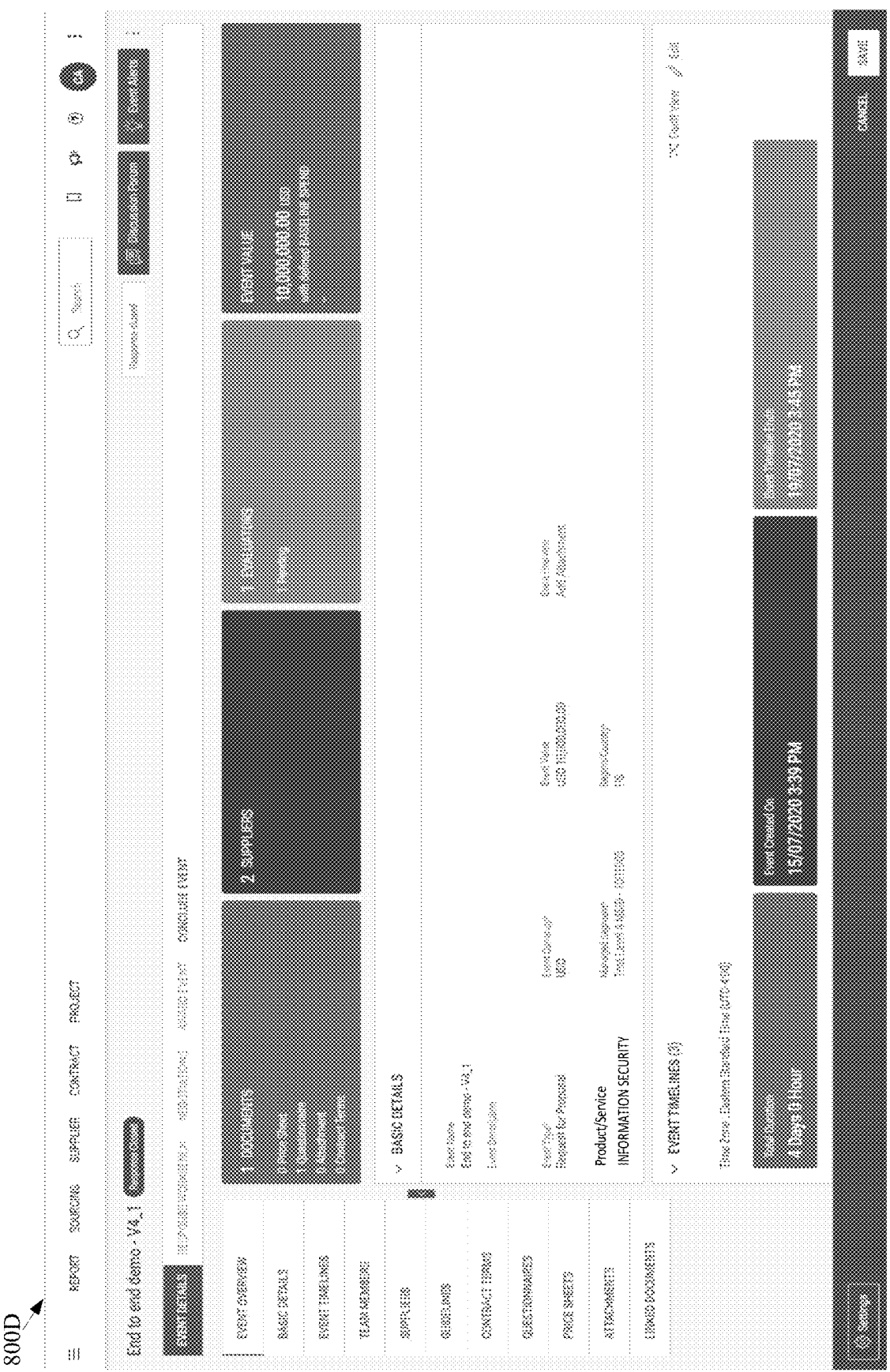
FIG. 8D shows an application user interface of the RFx event in accordance with an example embodiment of the invention.
Figure 8E:
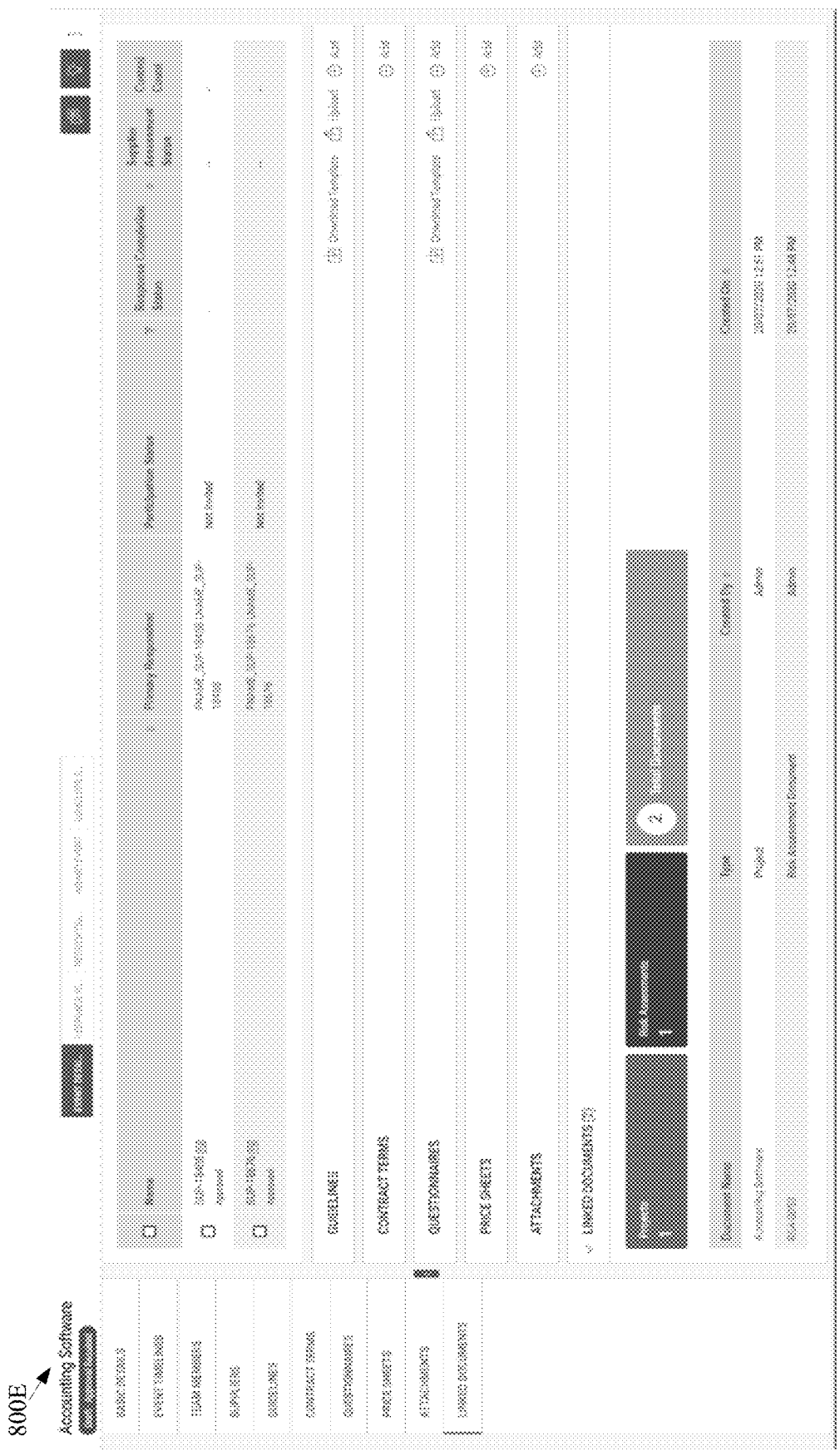
FIG. 8E shows an application user interface adding supplier to the RFx event in accordance with an example embodiment of the invention.

Referring to FIG. 8D, an application user interface of the RFx event is shown in accordance with an example embodiment of the invention. In the RFx event, Sourcing Buyer will identify and add Suppliers to the RFX event as shown by application interface 800E in FIG. 8E. Once RFX is Published, system will trigger Control form based on the project inherent risk. The internal control form will be triggered to the buyer user and the External control will be triggered to the Supplier User. Further, the System will also trigger the Supplier Risk data object. The response to the risk data object will be considered while calculating the Supplier Inherent Risk.

Figure 8F:
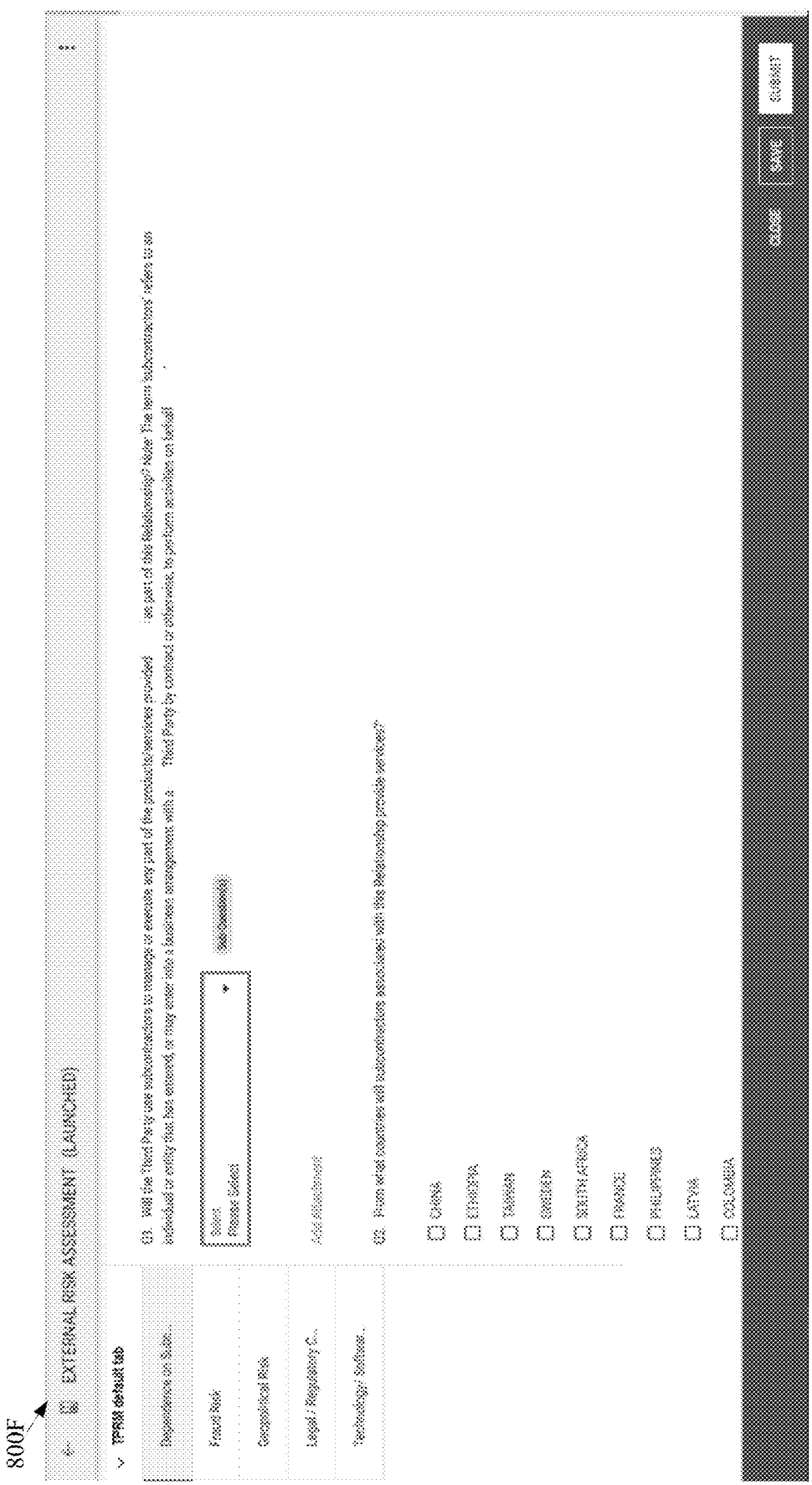
FIG. 8F shows an application user interface for external risk assessment in accordance with an example embodiment of the invention.

Referring to FIG. 8F, an application user interface 800F for external risk assessment is shown in accordance with an embodiment of the invention. The response to the risk data objects is auto populated by a bot based on AI processing of historical risk data. Alternately, the cognitive interface enables a user to respond to one or more of the risk data objects.

In an example embodiment, the SCM task is triggered through a plurality of data sources like the system triggers order for sourcing of an item but determines all quantity against the contract has been used. The system identifies that inventory level for the item is about to reach safety sock and the plant needs to place and order quickly to account for the lead time. The SCM task may also be generated if an organization is opening a new plant as a part of the expansion plan. Also, depending on the market conditions the system may predict and increase in demand for an item, therefore, organization needs to produce more by utilizing more capacity of existing plants. Since more lines will be operational, more inventory is needed.

In an exemplary embodiment, the risk management system user interface may enable cognitive computing to improve interaction between a user and the supply chain application(s). The intelligent interface provides insight into dynamically changing risk parameters such as key information obtained from live newsfeeds. The AI engine processes the newsfeed to draw relevance from the content and provide actionable insight for generating a risk data field on the interface. Alternately, the system is configured to assign weights to type of news feeds and impact of certain news on supply chain to auto rate the scenario and modify the risk data object or control data object for executing the task. The AI engine processes the newsfeed based on a data script configured for understanding the content and relating it to impact characteristics in real time. For Eg., If a contract is being renewed and it is found through a news feed that the supplier is involved in certain type of litigation in a Jurisdiction which may impact the execution of the task, then the AI engine shall automatically include a data field to determine the inherent risk and exclude the supplier from the list depending on the parameters preferred by a user. The live news feed providing such information is extremely useful in ensuring risk free renewal process for an entity. Further, in an advantageous aspect, the cognitive aspect of the invention enables a user to override an auto assessment by the AI engine if required.

In an exemplary embodiment, the present invention provides a category driven risk assessment, Risk assessments pre-sourcing and post-contract with the ability to inherit risk assessments from pre-sourcing stage to post-contract stage, Risk assessment document—a live document that keeps track of the risk assessment, inherent risk, categories (products/services), third parties, controls, gaps, control effectiveness and residual risk throughout the risk assessment lifecycle from project request through the RFx, contract and relationship of each third party selected and the third party awarded the contract. Further the invention enables reuse of controls, Cost management of controls, Automated selection of category (AI-ML based), AI-ML based residual risk prediction, Inherent risk model and profile computation, Contract to Relationship many-to-many association, Reuse of Relationship after awarding a contract, and ability to merge and split a Relationship.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A method of data processing for risk management, the method comprises:
   receiving a request for execution of a supply chain management (SCM) task at a server;
   identifying, by an artificial intelligence (AI) engine coupled to a processor, one or more risk data fields associated with execution of the task, wherein the risk data fields are fetched from a data lake based on one or more risk data models, wherein the one or more risk data models are created by the AI Engine by fetching a plurality of codes from a set of normalized historical risk data, extracting a plurality of distinct data from the normalized historical risk data to create a list of variables, and transforming the normalized historical risk data into a training data matrix using the list of variables;
   generating one or more risk data objects on an application user interface by structuring the identified risk data fields wherein a bot is configured to create a data script based on the supply chain management task, the one or more data models and artificial intelligence processing for structuring the risk data fields to generate the one or more risk data objects;
   training, by the AI engine, a machine learning risk prediction model to predict an inherent risk using the plurality of codes and the training data matrix;
   wherein training the machine learning risk prediction model comprises:
   determining an inherent risk characteristic score for the risk data objects where the risk data objects have an inherent risk characteristic score determined as:

$R_s = \Sigma[(D_s * D_w)/\Sigma D_{Tw}]$, where, Rs is risk characteristic score;
   Ds is Min/Max/Average data field Score;
   $D_w$ is data field weightage;
   $D_{Tw}$ is Total Weightage of all data fields;
   predicting, using the machine learning risk prediction model, an inherent risk associated with execution of the task based on a response to the risk data objects received at the server, wherein the bot analyzes the response to each of the one or more risk data objects for determining risk characteristics to predict the inherent risk;
   identifying and generating one or more actionable controls on the interface based on the predicted inherent risk for risk mitigation, wherein the actionable controls are one or more control data objects with structured control data fields impacting execution of the task; and
   retraining the machine learning risk prediction model by updating parameters to the training data matrix based on a control effectiveness rating.

2. The method of claim 1 further comprises responding to the risk data objects by the bot based on a plurality of historical risk data stored in a historical risk knowledge database wherein a backend risk data script created by the bot enables automation of risk assessment for the supply chain management task.

3. The method of claim 1 wherein the inherent risk includes risk associated with one or more supply chain management task including supplier management operation, Sourcing operation, inventory management operation, account payable operations, transportation management operation and material management operation.

4. The method of claim 1, wherein an inherent risk score ($IR_s$) for a sourcing operation is based on the inherent risk characteristic score is-determined as:

$IR_S = \Sigma[[R_{s1}/\Sigma R_{tw}] + [R_{s2}/\Sigma R_{tw}] + \ldots [R_{sn}/\Sigma R_{tw}]]$ where, $R_{s1}$ is risk characteristic score for first data field of the risk data object;
$R_{s2}$ is risk characteristic score for second data field of the risk data object;
$R_{sn}$ is risk characteristic score for nth data field of the risk data object;
$R_{tw}$ is Total Weightage of all risk characteristics.

5. The method of claim 1 further comprises:
an internal control data object and an external control data object, wherein the internal control data object is generated on application user interface of a buyer user and the external control data object is generated on application user interface of a supplier user.

6. The method of claim 5 further comprises receiving a response to one or more supplier risk data objects from a buyer user and a supplier user for predicting a supplier risk.

7. The method of claim 6 wherein the one or more supplier risk data object is generated on application user interface of the buyer user by structuring one or more supplier data fields wherein a bot is configured to create a supplier data script based on the supply chain management task, the one or more data models, the predicted inherent risk and artificial intelligence processing for structuring the supplier data fields to generate the one or more supplier risk data objects.

8. The method of claim 7 wherein an inherent Supplier risk characteristic score for the supplier risk data objects is determined as:

$$ISR_s = \Sigma[(SD_s * SID_w)/\Sigma SD_{Tw}]$$

where, $ISR_s$ is risk characteristic score
$SD_s$ is Min/Max/Average supplier data field Score;
$SD_w$ is Supplier data field weightage;
$SD_{Tw}$ is Total Weightage of all Supplier data fields.

9. The method of claim 8 wherein a Supplier risk score based on the inherent Supplier risk characteristic score is determined as:

$$SRs = \Sigma[[Max[Rsi, ISRsi] * ISRsi * IFsi] + [Max[Rs_2, ISRs_2] * ISRs_2 * IFs_2] + [Max[R_{sn}, ISR_{sn}] * ISR_{sn} * IF_{sn}]] + I_{rs}$$

where, $R_{s1}$ is risk characteristic score for first data field of the risk data object;
$ISR_{s1}$ is risk characteristic score for first data field of the supplier risk data object;
$IF_{s1}$ is a first interaction factor for a risk characteristic combination of parameters;
$R_n$ is risk characteristic score for nth data field of the risk data object;
$ISR_{sn}$ is risk characteristic score for the nth data field of the supplier risk data object;
$IF_{sn}$ is nth interaction factor for a risk characteristic combination of parameters;
$IR_s$ is Sourcing operation inherent risk score.

10. The method of claim 9 further comprises determining a residual risk rating from analysis of an overall control assessment rating per risk and an inherent risk rating predicted based on the inherent risk characteristic score, wherein the overall control assessment rating per risk ($C_{ar}$) is determined as:

$$C_{ar} = [(Wi * NC_1) + (W_2 * NC_2) + \ldots \ldots (W_n * NC_n)] Jai$$

where, Wi is weightage of a first control;
$NC_1$ is number of controls with W1 weightage;
$W_2$ is weightage of a second control;
$NC_2$ is number of controls with W2 weightage;
$W_n$ weightage of a nth control;
$NC_n$ is number of controls with $W_n$ weightage;
$TC_n$ is total number of control data objects including both $NC_1$, $NC_2$ and $NC_n$.

11. The method of claim 10 further comprises controlling execution of the supply chain management task by generating a code to prevent execution of the task in response to determination of the inherent risk and supplier risk being above a risk threshold.

12. The method of claim 1 wherein the artificial intelligence AI engine integrates deep learning, predictive analysis, information extraction and robotics for processing the task.

13. A System for risk management comprising:
a server configured for receiving a request to execute a supply chain management (SCM) task;
at least one processor coupled to an artificial intelligence (AI) engine for identifying one or more risk data fields associated with an execution of the task;
at least one memory chip storing instructions, when executed by the at least one processor and cause:
the at least one processor to fetch risk data fields from a data lake, the data lake storing the risk data fields and one or more risk data models, wherein the artificial intelligence engine creates the one or more risk data models by fetching a plurality of codes from a set of normalized historical risk data, extracting a plurality of distinct data from the normalized historical risk data to create a list of variables, and transforming the normalized historical risk data into a training data matrix using the list of variables;
an application user interface configured for generating one or more risk data objects by structuring the identified risk data fields, wherein a bot is configured to create a data script based on the supply chain management task, the one or more data models, and artificial intelligence-processing for structuring the risk data fields to generate the one or more risk data objects;
a controller encoded with instructions enabling the controller to function as the bot for enabling the artificial intelligence engine to train a machine learning risk prediction model to predict an inherent risk using the plurality of codes and the training data matrix and use the risk prediction model to predict an inherent risk associated with execution of the task based on a response to the risk data objects received at the server, wherein the bot analyzes the response to each of the one or more risk data objects for determining risk characteristics, wherein the risk data objects have an inherent risk characteristic score determined as:

$$R_s = \Sigma[(Ds * Dw)/\Sigma DTw],$$

where, $R_s$ is risk characteristic score;
Ds is Min/Max/Average data field Score;
$D_w$ is data field weightage;
$D_{Tw}$ is Total Weightage of all data fields;
one or more actionable controls identified and generated on the interface based on the predicted inherent risk for risk mitigation wherein the actionable controls are one or more control data objects with structured control data fields impacting execution of the task, wherein the machine learning risk prediction model is retrained by updating parameters to the training data matrix based on a control effectiveness rating.

14. The system of claim 13 wherein the artificial intelligence engine creates the one or more risk data models by additionally creating a risk data training model from the code and the data matrix using machine learning (ML) and artificial intelligence (AI).

15. The system of claim 13 further comprising one or more data model database includes one or more category specific data model database with category specific risk data model, one or more entity specific data model database with entity specific risk data model and at least one switching risk data model script database for switching between entity specific data model and category specific data model.

16. The system of claim 15, further comprising a data attribute library configured to enable comparison of extracted data fields data attribute with the library to detect presence or absence of certain attributes and deviations from a standard risk data object response template in the library wherein the deviations are analyzed to generate a risk score for quantifying the risk involved for an entity on execution of the supply chain management task.

17. The system of claim 16, wherein one or more dynamic weights are assigned to the data attributes for generating the risk score.

18. The system of claim 13 wherein the inherent risk includes risk associated with one or more supply chain management operation including supplier management operation, Sourcing operation, inventory management operation, account payable operations, transportation management operation and material management operation.

19. The system of claim 13 further comprises:
a historical risk data field knowledge database configured for storing a plurality of risk data fields processed by the artificial intelligence engine based on a plurality of parameters and the one or more data models to generate the risk data objects.

20. The system of claim 13 further comprises:
a historical risk knowledge database configured for storing a plurality of historical risk data for enabling the bot to respond to the risk data objects wherein a backend risk data script created by the bot enables automation of risk assessment for the supply chain management task.

21. The system of claim 13 further comprises:
a real-time updated impact parameter database configured for storing one or more impact parameters capable of modifying at least one of a risk data object, a supplier risk data object, inherent risk characteristic or the supplier risk characteristic.

22. The system of claim 13 further comprises a supplier database configured to store data of one or more suppliers recommended by the artificial intelligence engine wherein the suppliers are identified based on a plurality of factors including financial performance and risk ratings, revenue details, Supplier operational category, financial stability, spend data, client servicing, logistics, lead times, market fragmentation, capacity constraints, certifications, incumbent status, currency fluctuations and political risks.

23. The system of claim 22 further comprises a data solver configured for operating with the data scripts to accomplish structuring of data field.

24. The system of claim 13 further comprises a residual risk database configured for storing residual risk associated with execution of the task wherein the residual risk is determined based on the predicted inherent risk and an overall control data object assessment rating per risk.

25. The system of claim 13 further comprises an artificial intelligence based mapping script for mapping supply chain management task with Categories and data fields wherein the mapping script enables unsupervised data field discovery.

26. The system of claim 13 further comprises:
a front-end web server communicatively coupled to at least one database server, wherein the front-end web server is configured to process the task based on a plurality of scripts by receiving the risk data fields and control data fields and applying an artificial intelligence based dynamic processing logic to automate at least one task.

27. The system of claim 13, wherein the system is provided in a cloud or cloud-based computing environment.

28. The system of claim 13 further comprises a graph database configured to store graph structures for semantic queries with nodes, edges and properties to represent and store data.

29. The system of claim 28 wherein the graph database includes nodal connections of similar data values wherein data associated with the supply chain management task is added to the graph database for identifying related datasets wherein a connection of the supply chain management task associated data with the related dataset in a historical risk database is formed if a node in the graphical database with values similar to the supply chain management task associated data is present else a new node for the supply chain management task associated data is formed.

30. The system of claim 13 further comprising a rule engine, the rule engine having:
a compiler configured for processing the supply chain management task received from a user at the server through the application user interface of a supply chain management application; and
a code module configured for generating a plurality of protocols based on the task, a plurality of metadata, the one or more risk data objects, the one or more control data objects, and the one or more data models associated with the one or more risk data fields wherein the protocols are generated for executing the task based on an artificial intelligence based processing logic,
wherein the controller coupled to the rule engine enables prediction of the inherent risk associated with execution of the task based on the response to the risk data objects received at the server and triggers the one or more control data objects for risk mitigation to execute the task.

31. The system of claim 30 wherein the rule engine is configured for controlling execution of the supply chain management task wherein the code module generates a code to prevent execution of the task in response to determination of the inherent risk and supplier risk being above a risk threshold.

32. A computer program product for risk management in supply chain management application of a computing device with memory, the product comprising:
a computer readable storage medium readable by a processor and storing instructions for execution by the processor for performing a risk management method, the method comprises:
receiving a request for execution of a supply chain management (SCM) task at a server;
identifying by an artificial intelligence (AI) engine coupled to a processor, one or more risk data fields associated with execution of the task, wherein the risk data fields are fetched from a data lake based on one or more risk data models, wherein the one or more risk data models are created by the AI engine by fetching a plurality of codes from a set of normalized historical risk data, extracting a plurality of distinct data from the normalized historical risk data to create a list of variables, and transforming the normalized historical risk data into a training data matrix using the list of variables;
generating one or more risk data objects on an application user interface by structuring the identified risk data fields wherein a bot is configured to create a data script based on the supply chain management task, the one or more data models and artificial intelligence processing for structuring the risk data fields to generate the one or more risk data objects;
training, by the AI engine, a machine learning risk prediction model to predict an inherent risk using the plurality of codes and the training data matrix;
wherein training the machine learning risk prediction model comprises:

determining an inherent risk characteristic score for the one or more risk data objects where the risk data objects have an inherent risk characteristic score determined as:

$$Rs = \Sigma[(Ds*Dw)/\Sigma DTw],$$

where, Rs is risk characteristic score;
Ds is Min/Max/Average data field Score;
$D_w$ is data field weightage;
$D_{Tw}$ is Total Weightage of all data fields;
predicting, using the machine learning prediction model, an inherent risk associated with execution of the task based on a response to the risk data objects received from a user wherein the bot analyzes the response to each of the one or more risk data objects for determining risk characteristics to predict inherent risk;
identifying and generating one or more actionable controls on the interface based on the predicted inherent risk for risk mitigation wherein the actionable controls are one or more control data objects with structured control data fields impacting execution of the task; and
retraining the machine learning risk prediction model by updating parameters to the training data matrix based on a control effectiveness rating.

33. A system of data processing for risk management, the system comprises:
a server configured to receive a request for execution of a supply chain management (SCM) task;
at least one processor; and
at least one memory chip storing instructions and data usable by the at least one processor, the at least one processor configured to:
identify one or more risk data fields associated with execution of the supply chain management task, wherein the risk data fields are fetched from the at least one memory chip based on one or more risk data models, wherein the at least one processor uses an artificial intelligence engine to create the one or more risk data models by fetching a plurality of codes from a set of normalized historical risk data, extracting a plurality of distinct data from the normalized historical risk data to create a list of variables, and transforming the normalized historical risk data into a training data matrix using the list of variables,
generate one or more risk data objects on an application user interface by structuring the identified risk data fields, wherein a bot is configured to create a data script based on the supply chain management task, the one or more data models and artificial intelligence processing for structuring the risk data fields to generate the one or more risk data objects, train, using the artificial intelligence engine, a machine learning risk prediction model to predict an inherent risk using the plurality of codes and the training data matrix, wherein training the machine learning risk prediction model includes determining an inherent risk characteristic score for the risk data objects where the risk data objects have an inherent risk characteristic score determined as:

$$Rs = \Sigma[(Ds*Dw)/\Sigma DTw],$$

where, Rs is risk characteristic score;
Ds is Min/Max/Average data field Score;
$D_w$ is data field weightage;
$D_{Tw}$ is Total Weightage of all data fields;
predict, using the machine learning risk prediction model, an inherent risk associated with execution of the supply chain management task based on a response to the risk data objects received at the server, wherein the bot analyzes the response to each of the one or more risk data objects for determining risk characteristics to predict the inherent risk, and
identify and generate one or more actionable controls on the interface based on the predicted inherent risk for risk mitigation, wherein the actionable controls are one or more control data objects with structured control data fields impacting execution of the supply chain management task, and
retrain the machine learning risk prediction model by updating parameters to the training data matrix on a control effectiveness rating.

\* \* \* \* \*